(12) United States Patent
Han et al.

(10) Patent No.: US 8,660,094 B2
(45) Date of Patent: Feb. 25, 2014

(54) METHOD AND APPARATUS FOR DATA TRANSMISSION USING A PLURALITY OF RESOURCES IN A MULTIPLE ANTENNA SYSTEM

(75) Inventors: Seung Hee Han, Anyang-si (KR); Jin Sam Kwak, Anyang-si (KR); Hyun Soo Ko, Anyang-si (KR); Jae Hoon Chung, Anyang-si (KR); Moon Il Lee, Anyang-si (KR); Yeong Hyeon Kwon, Anyang-si (KR)

(73) Assignee: LG Electronics Inc., Seoul (KR)

( * ) Notice: Subject to any disclaimer, the term of this patent is extended or adjusted under 35 U.S.C. 154(b) by 233 days.

(21) Appl. No.: 13/126,163

(22) PCT Filed: Nov. 13, 2009

(86) PCT No.: PCT/KR2009/006697
§ 371 (c)(1),
(2), (4) Date: Apr. 26, 2011

(87) PCT Pub. No.: WO2010/056069
PCT Pub. Date: May 20, 2010

(65) Prior Publication Data
US 2011/0205994 A1    Aug. 25, 2011

Related U.S. Application Data

(60) Provisional application No. 61/114,479, filed on Nov. 14, 2008, provisional application No. 61/114,480, filed on Nov. 14, 2008, provisional application No. 61/115,113, filed on Nov. 17, 2008, provisional application No. 61/224,924, filed on Jul. 13, 2009, provisional application No. 61/228,143, filed on Jul. 23, 2009, provisional application No. 61/228,977, filed on Jul. 28, 2009, provisional application No. 61/238,222, filed on Aug. 31, 2009.

(51) Int. Cl.
*H04B 7/216* (2006.01)
*H04J 3/06* (2006.01)
*H04L 27/28* (2006.01)
*H04B 17/00* (2006.01)

(52) U.S. Cl.
USPC ........... 370/334; 370/343; 370/350; 375/260; 455/67.13; 455/501

(58) Field of Classification Search
None
See application file for complete search history.

(56) References Cited

U.S. PATENT DOCUMENTS

| | | | |
|---|---|---|---|
| 2003/0073410 A1* | 4/2003 | Hottinen et al. | 455/69 |
| 2003/0165189 A1* | 9/2003 | Kadous | 375/225 |
| 2004/0165558 A1* | 8/2004 | Ling et al. | 370/334 |
| 2005/0245197 A1* | 11/2005 | Kadous et al. | 455/67.13 |

(Continued)

FOREIGN PATENT DOCUMENTS

| JP | 2003204313 | 7/2003 |
|---|---|---|
| KR | 1020030069299 | 8/2003 |

(Continued)

OTHER PUBLICATIONS

Japan Patent Office Application Serial No. 2011-533120, Office Action dated Feb. 1, 2013, 2 pages.

(Continued)

*Primary Examiner* — Melanie Jagannathan
(74) *Attorney, Agent, or Firm* — Lee, Hong, Degerman, Kang & Waimey

(57) ABSTRACT

A method and apparatus are provided for data transmission using a plurality of resources in a multiple antenna system. An m (m>1) number of bits from each encoded bit are mapped onto a resource to form a plurality of modulation symbols. With respect to said plurality of modulation symbols, spatial processing is performed according to a plurality of resources and a plurality of antennae to generate a plurality of transmission symbols. Each of said plurality of transmission symbols is transmitted via each of the corresponding multiple antennae.

10 Claims, 30 Drawing Sheets

(56) References Cited

U.S. PATENT DOCUMENTS

| | | | |
|---|---|---|---|
| 2006/0067416 A1 | 3/2006 | Tirkkonen et al. | |
| 2006/0285531 A1* | 12/2006 | Howard et al. | 370/343 |
| 2007/0189263 A1* | 8/2007 | Izumi et al. | 370/350 |
| 2008/0225965 A1* | 9/2008 | Pi et al. | 375/260 |
| 2009/0291699 A1* | 11/2009 | Heath et al. | 455/501 |

FOREIGN PATENT DOCUMENTS

| | | |
|---|---|---|
| KR | 1020050053787 | 6/2005 |
| KR | 1020070043880 | 4/2007 |

OTHER PUBLICATIONS

Mesleh, et al., "Spatial Modulation," IEEE Transactions on Vehicular Technology, vol. 57, No. 4, Jul. 2008, 14 pages.

Japan Patent Office Application Serial No. 2011-533120, Notice of Allowance dated Sep. 10, 2013, 3 pages.

Mesleh, et al., "Spatial Modulation," IEEE Transactions on Vehicular Technology, vol. 57, No. 4, Jul. 2008, pp. 2228-2241.

* cited by examiner

FIG. 15

$$\begin{matrix} & \text{1st Antenna} & \text{2nd Antenna} \\ & \downarrow & \downarrow \end{matrix}$$

$$\begin{matrix} Ics1 \to \\ Ics2 \to \end{matrix} \begin{bmatrix} S_1 & -S_2^* \\ S_2 & S_1^* \end{bmatrix}$$

FIG. 16

$$d(0), Ics2 \rightarrow \begin{pmatrix} S_1 & -S_2^* \\ S_2 & S_1^* \end{pmatrix} \begin{array}{l} \longrightarrow d(0)\ r(n, Ics2) \rightarrow \text{1st Antenna} \\ \longrightarrow -d(0)^*\ r(n, Ics1) \rightarrow \text{2nd Antenna} \end{array}$$

$$d(0), Ics2 \rightarrow \begin{pmatrix} S_1 & S_2 \\ -S_2^* & S_1^* \end{pmatrix} \begin{array}{l} \longrightarrow -d(0)^*\ r(n, Ics2) \rightarrow \text{1st Antenna} \\ \longrightarrow d(0)\ r(n, Ics1) \rightarrow \text{2nd Antenna} \end{array}$$

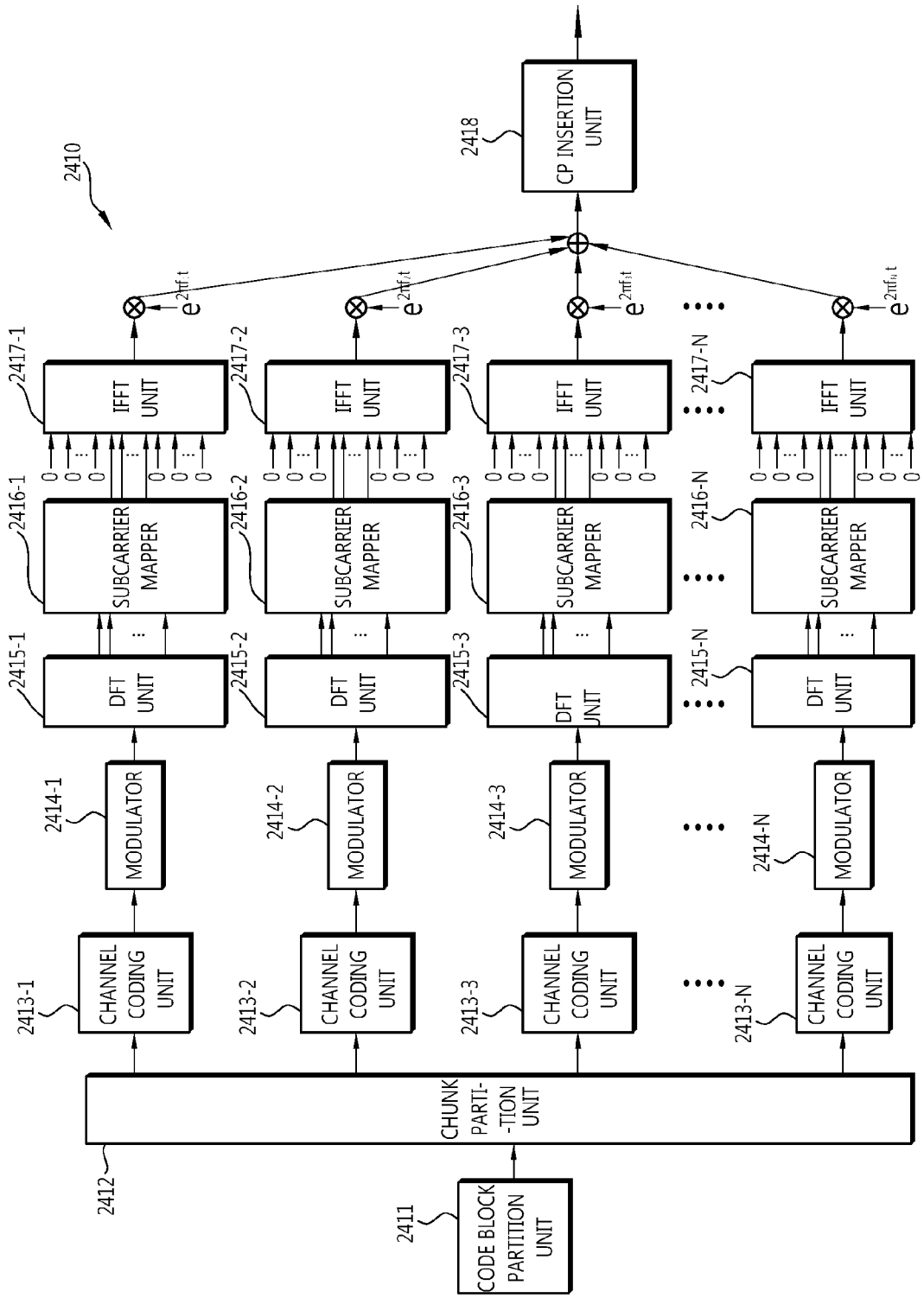

METHOD AND APPARATUS FOR DATA TRANSMISSION USING A PLURALITY OF RESOURCES IN A MULTIPLE ANTENNA SYSTEM

CROSS-REFERENCE TO RELATED APPLICATIONS

This application is the National Stage filing under 35 U.S.C. 371 of International Application No. PCT/KR2009/006697, filed on Nov. 13, 2009, which claims the benefit of U.S. Provisional Application Ser. Nos. 61/114,479, filed on Nov. 14, 2008, 61/114,480, filed on Nov. 14, 2008, 61/115,113, filed on Nov. 17, 2008, 61/224,924, filed on Jul. 13, 2009, 61/228,143, filed on Jul. 23, 2009, 61/228,977, filed on Jul. 28, 2009, and 61/238,222, filed on Aug. 31, 2009, the contents of which are incorporated by reference herein in their entirety.

FIELD OF THE INVENTION

The present invention relates to wireless communication, and more particularly, to a method and apparatus for transmitting data using a plurality of resources in a multi-antenna system.

RELATED ART

LTE (long term evolution) based on 3GPP (3rd Generation Partnership Project) TS (Technical Specification) Release 8 is a leading next-generation mobile communication standard.

As described in 3GPP TS 36.211 V8.4.0 (2008-09) "Evolved Universal Terrestrial Radio Access (E-UTRA); Physical Channels and Modulation (Release 8)", in LTE, physical channels may be classified into a PDSCH (Physical Downlink Shared Channel) and a PUSCH (Physical Uplink Shared Channel) (i.e., data channels) and a PDSCH (Physical Downlink Control Channel) and a PUCCH (Physical Uplink Control Channel) (i.e., control channels).

A PDCCH (i.e., a downlink control channel) carries a downlink grant for the PDSCH reception of a UE (User Equipment) and an uplink grant for the PUSCH transmission of a UE. PUCCHs (i.e., uplink control channels) carry uplink control signals, such as ACK (positive-acknowledgement)/NACK (negative-acknowledgement) signals for an HARQ (hybrid automatic repeat request), a CQI (channel quality indicator) indicating a downlink channel state, and an SR (scheduling request) to request the allocation of radio resources for uplink transmission.

The transmission reliability of the control channel may be said to be more important than the transmission capacity thereof. If error occurs in the transmission of the control channel, data channels may never be received, or scheduling or the execution of an HARQ may be heavily damaged. Accordingly, the payload of the control channel is chiefly limited to several bits to several tens of bits. Furthermore, in the uplink control channel, a PAPR (Peak-to-Average Power Ratio)/CM (cubic metric) characteristic is important for the power management of a UE. For a long idle time and low battery consumption, the uplink control channel needs to have a low PAPR/CM characteristic. To this end, in LTE, a sequence and a transmission scheme having a low PAPR/CM characteristic are used in the uplink control channel.

MIMO (Multiple Input Multiple Output) technology increases transmission reliability and transmission/reception efficiency using multiple antennas. A current LTE standard uses a maximum of four transmission antennas in downlink transmission, but does not adopt multiple antennas in uplink transmission.

There is a need for a scheme capable of increasing the transmission capacity of a channel or improving transmission reliability in a multi-antenna system.

SUMMARY OF THE INVENTION

An object of the present invention is to provide the structure of a channel which is capable of improving transmission reliability using a plurality of resources in a multi-antenna system.

Another object of the present invention is to provide the structure of a channel which is capable of increasing a transmission capacity using a plurality of resources in a multi-antenna system.

Yet another object of the present invention is to provide a method and apparatus which are capable of selectively transmitting a plurality of resources according to bits in a multi-antenna system.

In an aspect, a method of transmitting data using a plurality of resources in a multi-antenna system is provided. The method includes generating a plurality of modulation symbols by mapping encoded bits on a constellation by m (m>1) bits, generating a plurality of transmission symbols by performing spatial processing, according to a plurality of resources and a plurality of antennas, for the plurality of modulation symbols, and transmitting the plurality of transmission symbols through the plurality of respective antennas. The modulation symbols on the constellation are generated based on the plurality of resources, corresponding to n (n≥1) bits of the m bits, and PSK (Phase Shift Keying) of a $2^{(m-n)}$ order or QAM (quadrature amplitude modulation) of a $2^{(m-n)}$ order corresponding to (m−n) bits.

The plurality of resources may be a plurality of cyclic shift indices.

The plurality of resources may include a first cyclic shift index $I_{cs1}$ and a second cyclic shift index $I_{cs2}$, and m=4 and n=1.

The constellation may be an 8-PSK constellation, such as the following table.

| $I_{cs1}$ | | $I_{cs2}$ | |
|---|---|---|---|
| I | Q | I | Q |
| $-1/\sqrt{2}$ | $-1/\sqrt{2}$ | | |
| $-1$ | $0$ | | |
| | | $-1$ | $0$ |
| | | $-1/\sqrt{2}$ | $-1/\sqrt{2}$ |
| | | $0$ | $1$ |
| $-1/\sqrt{2}$ | $1/\sqrt{2}$ | $0$ | $0$ |
| | | $-1/\sqrt{2}$ | $1/\sqrt{2}$ |
| $0$ | $1$ | | |
| $0$ | $-1$ | | |
| | | $1/\sqrt{2}$ | $-1/\sqrt{2}$ |
| $1/\sqrt{2}$ | $-1/\sqrt{2}$ | | |
| | | $0$ | $-1$ |
| | | $1/\sqrt{2}$ | $1/\sqrt{2}$ |
| | | $1$ | $0$ |
| $1$ | $0$ | | |
| $1/\sqrt{2}$ | $1/\sqrt{2}$ | | |

A first transmission symbol corresponding to a first antenna and a second transmission symbol corresponding to a second antenna may be generated from one modulation symbol through the spatial processing.

The second transmission symbol may have a complex conjugate or negative complex conjugate relationship with the first transmission symbol.

Resources used by the first transmission symbol and the second transmission symbol may be different from each other.

The plurality of resources may be allocated by a base station. The base station may inform information about one of the plurality of resources, and the remaining resources may be obtained from the informed resource.

In another aspect, a transmitter having multiple antennas includes a mapper generating a plurality of modulation symbols by mapping encoded bits on a constellation by m (m>1) bits, a spatial processor generating a plurality of transmission symbols by performing spatial processing, according to a plurality of resources and a plurality of antennas, for the plurality of modulation symbols, and a plurality of antennas transmitting the plurality of transmission symbols. The mapper generates the modulation symbols on the constellation based on the plurality of resources, corresponding to n (n≤1) bits of the m bits, and PSK (Phase Shift Keying) of a $2^{(m-n)}$ order or QAM (quadrature amplitude modulation) of a $2^{(m-n)}$ order corresponding to (m–n) bits.

The payload of a channel can be increased without deteriorating the PAPR/CM characteristic of a channel by introducing an MIMO scheme. Furthermore, system performance can be improved by increasing transmission reliability of a channel.

BRIEF DESCRIPTION OF THE DRAWINGS

FIG. 15 is an exemplary diagram illustrating the meaning of an SCBC.

FIG. 16 shows an example of processing of an SCBC matrix.

FIG. 30 is a block diagram showing yet another example of a signal processing apparatus supporting multiple carriers.

DESCRIPTION OF EXEMPLARY EMBODIMENTS

The following technology may be used in a variety of multi-access schemes, such as CDMA (code division multiple access), FDMA (frequency division multiple access), TDMA (time division multiple access), OFDMA (orthogonal frequency division multiple access), and SC-FDMA (single carrier frequency division multiple access).

Figure 1:
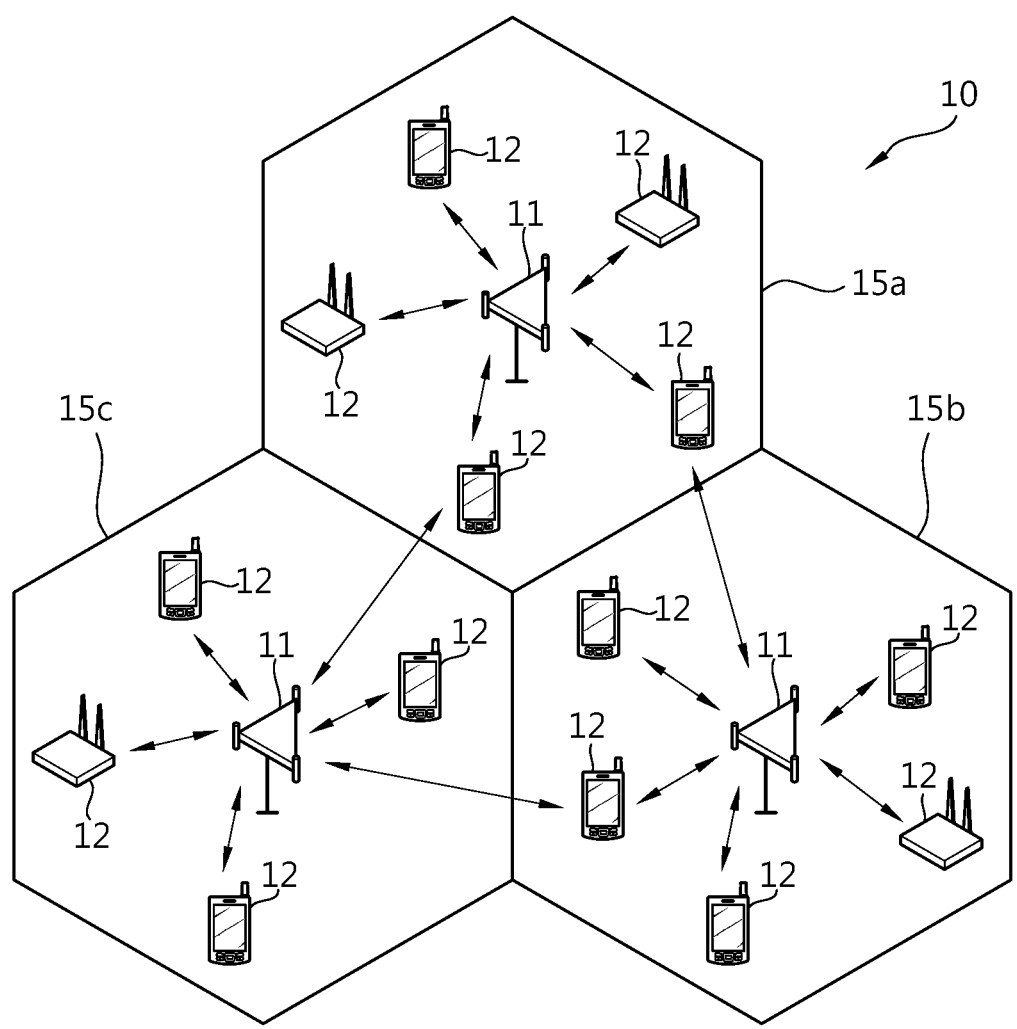
FIG. 1 is a block diagram showing a wireless communication system.

FIG. 1 is a block diagram showing a wireless communication system. The wireless communication system 10 includes at least one base station (BS) 11. Each BS provides communication service to a specific geographical area (commonly called a cell) 15a, 15b, or 15c. The cell may be classified into a plurality of areas (called sectors). The sector itself refers to the cell as occasion demands. A user equipment (UE) 12 may be fixed or mobile and may also be called another terminology, such as an MS (mobile station), a UT (user terminal), an SS (subscriber station), a wireless device, a PDA (personal digital assistant), a wireless modem, or a handheld device. The BS commonly refers to a fixed station communicating with the UE 12, and it may be called another terminology, such as an eNB (evolved-NodeB), a BTS (Base Transceiver System), or an access point.

The wireless communication system can support an uplink HARQ (Hybrid Automatic Repeat Request) or a downlink HARQ (Hybrid Automatic Repeat Request) or both. Furthermore, the wireless communication system may use a CQI (channel quality indicator) in order to support AMC (Adaptive Modulation and Coding).

The CQI is for indicating a downlink channel state. The CQI may include a CQI index, indicating each entity in an MCS (Modulation and Coding Scheme) table consisting of a combination of code rates and modulation schemes and including a number of entities or a PMI (Precoding Matrix Index) (i.e., the index of a precoding matrix on the codebook) or both. The CQI may indicate a channel state for the entire band or a channel state for a part of the entire band or both.

Figure 2:
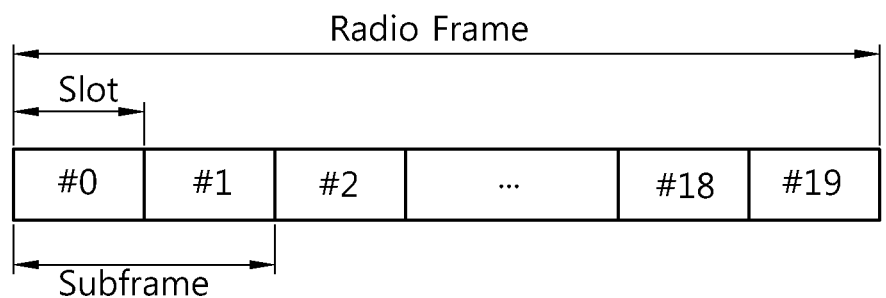
FIG. 2 shows the structure of a radio frame in 3GPP LTE.

FIG. 2 shows the structure of a radio frame in 3GPP LTE. The radio frame includes ten subframes. One subframe includes two slots. The slots within the radio frame are given slot numbers from #0 to #19. The time that it takes to transmit one subframe is called a TTI (transmission time interval). The TTI may be said to be a scheduling unit for data transmission. For example, the length of one radio frame may be 10 ms, the length of one subframe may be 1 ms, and the length of one slot may be 0.5 ms.

Figure 3:
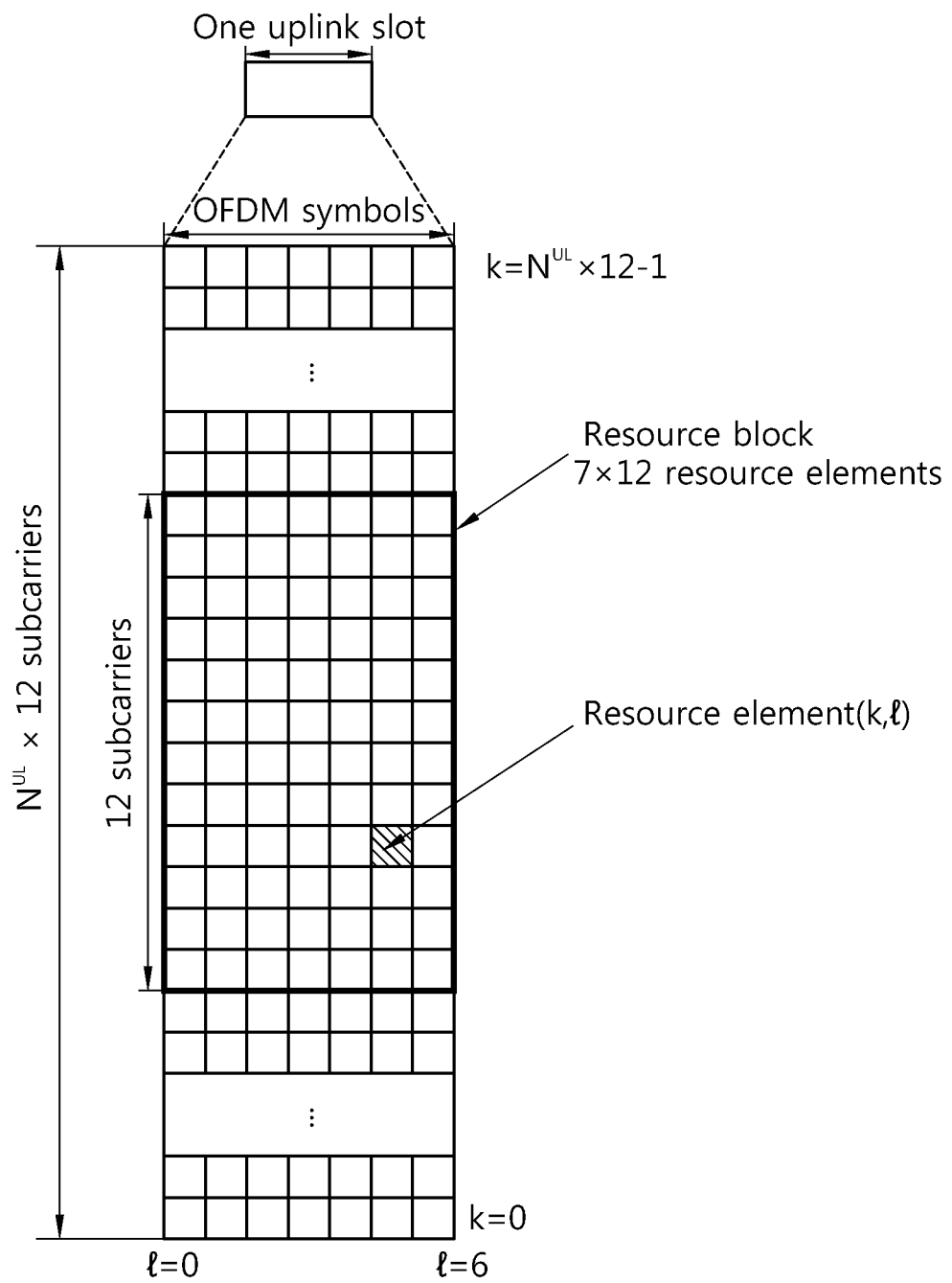
FIG. 3 is an exemplary diagram showing a resource grid for one uplink slot in 3GPP LTE.

FIG. 3 is an exemplary diagram showing a resource grid for one uplink slot in 3GPP LTE. The uplink slot includes a plurality of OFDM (orthogonal frequency division multiplexing) symbols in the time domain and includes a plurality of subcarriers in the frequency domain. The OFDM symbol is for representing a symbol period in the time domain. The OFDM symbol may be called an SC-FDMA symbol, an OFDMA symbol, or a symbol period according to a multi-access scheme.

A resource block includes a plurality of subcarriers in one slot. The number $N^{UL}$ of resource blocks included in the uplink slot depends on an uplink transmission bandwidth set in a cell.

Each element on the resource grid is called a resource element. The resource element on the resource grid can be identified by an index pair (k, l) within a slot. Here, k (k=0, . . . , $N^{UL}$×12−1) is a subcarrier index in the frequency domain, and l (l=0, . . . , 6) is a symbol index in the time domain.

Here, one slot is illustrated to include 7 OFDM symbols in the time domain, the resource block is illustrated to include 12 subcarriers in the frequency domain, and thus one resource block is illustrated to include 7×12 resource elements. However, the technical spirit of the present invention is not limited thereto. In 3GPP LTE, one slot includes 7 OFDM symbols in a normal CP (Cyclic Prefix) and includes 6 OFDM symbols in an extended CP.

Figure 4:
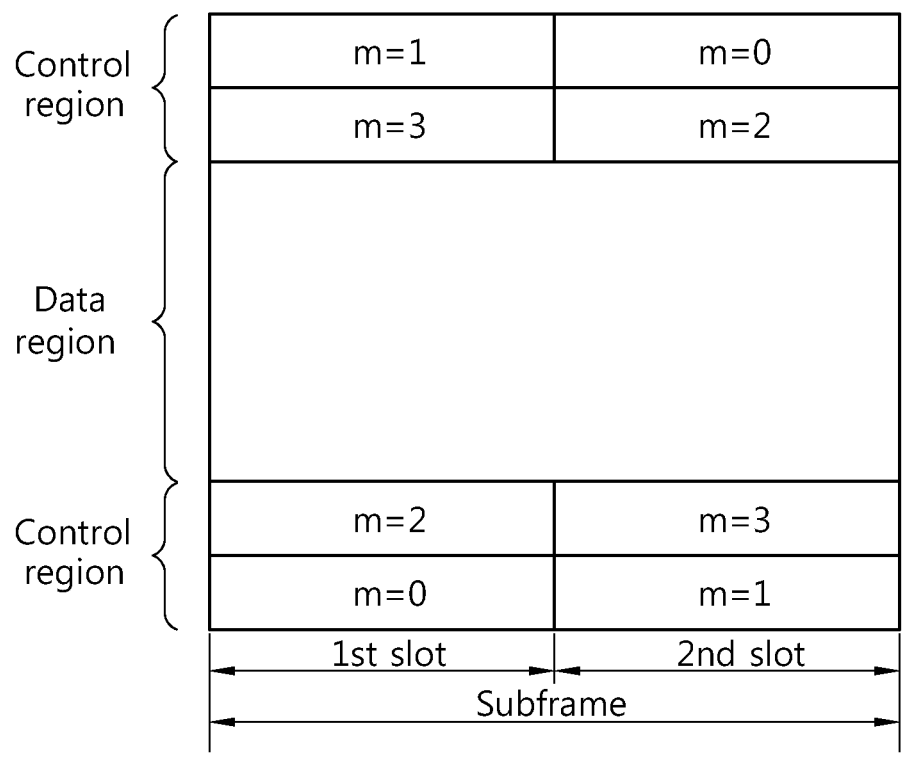
FIG. 4 shows an example of an uplink subframe in 3GPP LTE.

FIG. 4 shows an example of an uplink subframe in 3GPP LTE. The uplink subframe can be divided into a control region to which a PUCCH (Physical Uplink Control Channel) carrying uplink control information is allocated and a data region to which a PUSCH (Physical Uplink Shared Channel) carrying uplink data is allocated. A PUCCH for one UE is allocated in the form of a resource block pair in a subframe. Resource blocks belonging to the resource block pair occupy different subcarriers in a first slot and a second slot. m is a position index indicating the logical frequency domain position of a resource block pair allocated to a PUCCH within a subframe It can be seen that resource blocks having the same m value occupy different subcarriers in two slots.

According to 3GPP TS 36.211 V8.5.0 (2008-12), a PUCCH supports multiple formats. A PUCCH having a different number of bits per subframe may be used according to a modulation scheme dependent on a PUCCH format. The following table shows an example of modulation schemes and the number of bits per subframe according to PUCCH formats.

TABLE 1

| PUCCH Format | Modulation Scheme | Number of Bits Per Subframe |
|---|---|---|
| 1 | N/A | N/A |
| 1a | BPSK | 1 |
| 1b | QPSK | 2 |
| 2 | QPSK | 20 |
| 2a | QPSK + BPSK | 21 |
| 2b | QPSK + BPSK | 22 |

The PUCCH format 1 is used in the transmission of an SR (Scheduling Request), the PUCCH formats 1a/1b are used in the transmission of an ACK/NACK signal for a HARQ, the PUCCH format 2 is used in the transmission of a CQI, and the PUCCH formats 2a/2b are used in the simultaneous transmission of a CQI and an ACK/NACK signal. When only an ACK/NACK signal is transmitted in a subframe, the PUCCH formats 1a/1b are used. When an SR is solely transmitted, the PUCCH format 1 is used. When an SR and an ACK/NACK signal are transmitted at the same time, the PUCCH format 1 is used, and the ACK/NACK signal is modulated into resources allocated to the SR and then transmitted.

All the PUCCH formats use the cyclic shift (CS) of a sequence in each OFDM symbol. A cyclic-shifted sequence is generated by cyclically shifting a base sequence by a specific CS amount. The specific CS amount is indicated by a CS index. Various kinds of sequences may be used as the base sequence. For example, well-known sequences, such as a PN (pseudo-random) sequence and a CAZAC (Constant Amplitude Zero Auto-Correlation) sequence, may be used as the base sequence. A ZC (Zadoff-Chu) sequence is a kind of CAZAC sequence.

For example, the base sequence $r_u(n)$ may be defined as in the following equation.

$$r_u(n)=e^{jb(n)\pi/4} \quad \text{[Equation 1]}$$

Here, u is a root index, and n is an element index (0≤n≤N−1, where N is the length of the base sequence). The length of a sequence is equal to the number of elements included in the sequence. u may be determined by a cell ID (identifier), a slot number within a radio frame, and so on. Assuming that a base sequence is mapped to one resource block in the frequency domain, the length N of the base sequence becomes 12 because one resource block includes 12 subcarriers. A different base sequence is defined according to a different root index.

In 3GPP TS 36.211 V8.5.0 (2008-12), assuming that N=12 and u {0, . . . , 29}, b(n) is defined as in the following table.

TABLE 2

| u | b(0), . . . , b(11) | | | | | | | | | | | |
|---|---|---|---|---|---|---|---|---|---|---|---|---|
| 0 | −1 | 1 | 3 | −3 | 3 | 3 | 1 | 1 | 3 | 1 | −3 | 3 |
| 1 | 1 | 1 | 3 | 3 | 3 | −1 | 1 | −3 | −3 | 1 | −3 | 3 |
| 2 | 1 | 1 | −3 | −3 | −3 | −1 | −3 | −3 | 1 | −3 | 1 | −1 |
| 3 | −1 | 1 | 1 | 1 | 1 | −1 | −3 | −3 | 1 | −3 | 3 | −1 |
| 4 | −1 | 3 | 1 | −1 | 1 | −1 | −3 | −1 | 1 | −1 | 1 | 3 |
| 5 | 1 | −3 | 3 | −1 | −1 | 1 | 1 | −1 | −1 | 3 | −3 | 1 |
| 6 | −1 | 3 | −3 | −3 | −3 | 3 | 1 | −1 | 3 | 3 | −3 | 1 |
| 7 | −3 | −1 | −1 | −1 | 1 | −3 | 3 | −1 | 1 | −3 | 3 | 1 |
| 8 | 1 | −3 | 3 | 1 | −1 | −1 | −1 | 1 | 1 | 3 | −1 | 1 |
| 9 | 1 | −3 | −1 | 3 | 3 | −1 | −3 | 1 | 1 | 1 | 1 | 1 |
| 10 | −1 | 3 | −1 | 1 | 1 | −3 | −3 | −1 | −3 | −3 | 3 | −1 |
| 11 | 3 | 1 | −1 | −1 | 3 | 3 | −3 | 1 | 3 | 1 | 3 | 3 |
| 12 | 1 | −3 | 1 | 1 | −3 | 1 | 1 | 1 | −3 | −3 | −3 | 1 |
| 13 | 3 | 3 | −3 | 3 | −3 | 1 | 1 | 3 | −1 | −3 | 3 | 3 |
| 14 | −3 | 1 | −1 | −3 | −1 | 3 | 1 | 3 | 3 | 3 | −1 | 1 |
| 15 | 3 | −1 | 1 | −3 | −1 | −1 | 1 | 1 | 3 | 1 | −1 | −3 |
| 16 | 1 | 3 | 1 | −1 | 1 | 3 | 3 | 3 | −1 | −1 | 3 | −1 |
| 17 | −3 | 1 | 1 | 3 | −3 | 3 | −3 | −3 | 3 | 1 | 3 | −1 |
| 18 | −3 | 3 | 1 | 1 | −3 | 1 | −3 | −3 | −1 | −1 | 1 | −3 |
| 19 | −1 | 3 | 1 | 3 | 1 | −1 | −1 | 3 | −3 | −1 | −3 | −1 |
| 20 | −1 | −3 | 1 | 1 | 1 | 1 | 3 | 1 | −1 | 1 | −3 | −1 |
| 21 | −1 | 3 | −1 | 1 | −3 | −3 | −3 | −3 | −3 | 1 | −1 | −3 |
| 22 | 1 | 1 | −3 | −3 | −3 | −3 | −1 | 3 | −3 | 1 | −3 | 3 |
| 23 | 1 | 1 | −1 | −3 | −1 | −3 | 1 | −1 | 1 | 3 | −1 | 1 |
| 24 | 1 | 1 | 3 | 1 | 3 | 3 | −1 | 1 | −1 | −3 | −3 | 1 |
| 25 | 1 | −3 | 3 | 3 | 1 | 3 | 3 | 1 | −3 | −1 | −1 | 3 |
| 26 | 1 | 3 | −3 | −3 | 3 | −3 | 1 | −1 | −1 | 3 | −1 | −3 |
| 27 | −3 | −1 | −3 | −1 | −3 | 3 | 1 | −1 | 1 | 3 | −3 | −3 |
| 28 | −1 | 3 | −3 | 3 | −1 | 3 | 3 | −3 | 3 | 3 | −1 | −1 |
| 29 | 3 | −3 | −3 | −1 | −1 | −3 | −1 | 3 | −3 | 3 | 1 | −1 |

A cyclic-shifted sequence $r(n, I_{cs})$ may be generated by cyclically shifting the base sequence r(n) as in the following equation.

$$r(n, I_{cs}) = r(n) \cdot \exp\left(\frac{j2\pi I_{cs}n}{N}\right), \quad 0 \le I_{cs} \le N-1 \quad \text{[Equation 2]}$$

Here, $I_{cs}$ is a cyclic shift index indicating a CS amount ($0 \le I_{cs} \le N-1$).

Hereinafter, the available cyclic shift index of a base sequence refers to a cyclic shift index derivable from the base sequence according to a CS interval. For example, assuming that the length of a base sequence is 12 and a CS interval is 1, the available cyclic shift index of the base sequence is a total of 12. Alternatively, assuming that the length of a base sequence is 12 and a CS interval is 2, the available cyclic shift index of the base sequence is a total of 6.

The transmission of an HARQ ACK/NACK signal in the PUCCH format 1 is first described.

Figure 5:
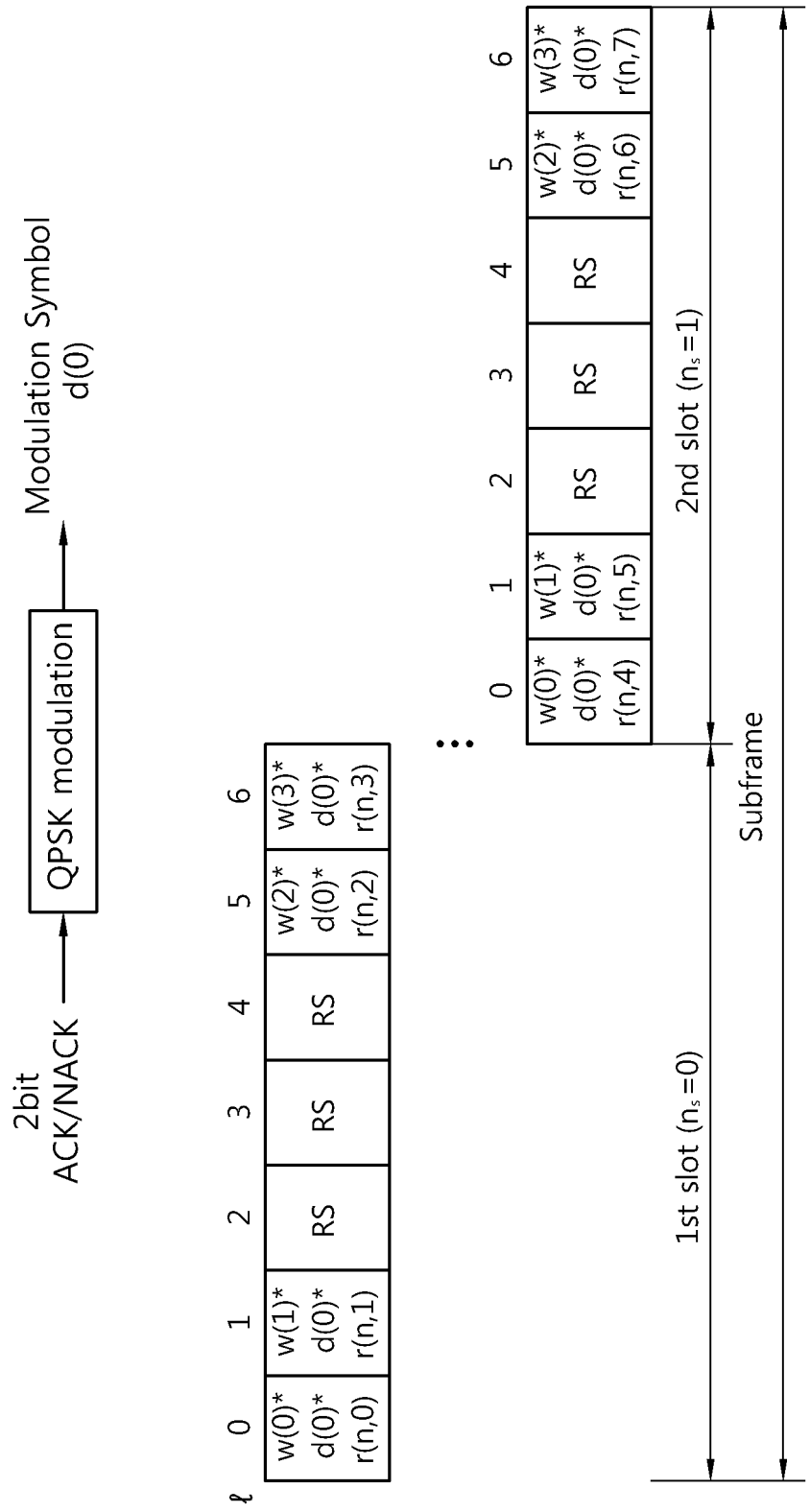
FIG. 5 shows a PUCCH format 1 in a normal CP in 3GPP LTE.
Figure 6:
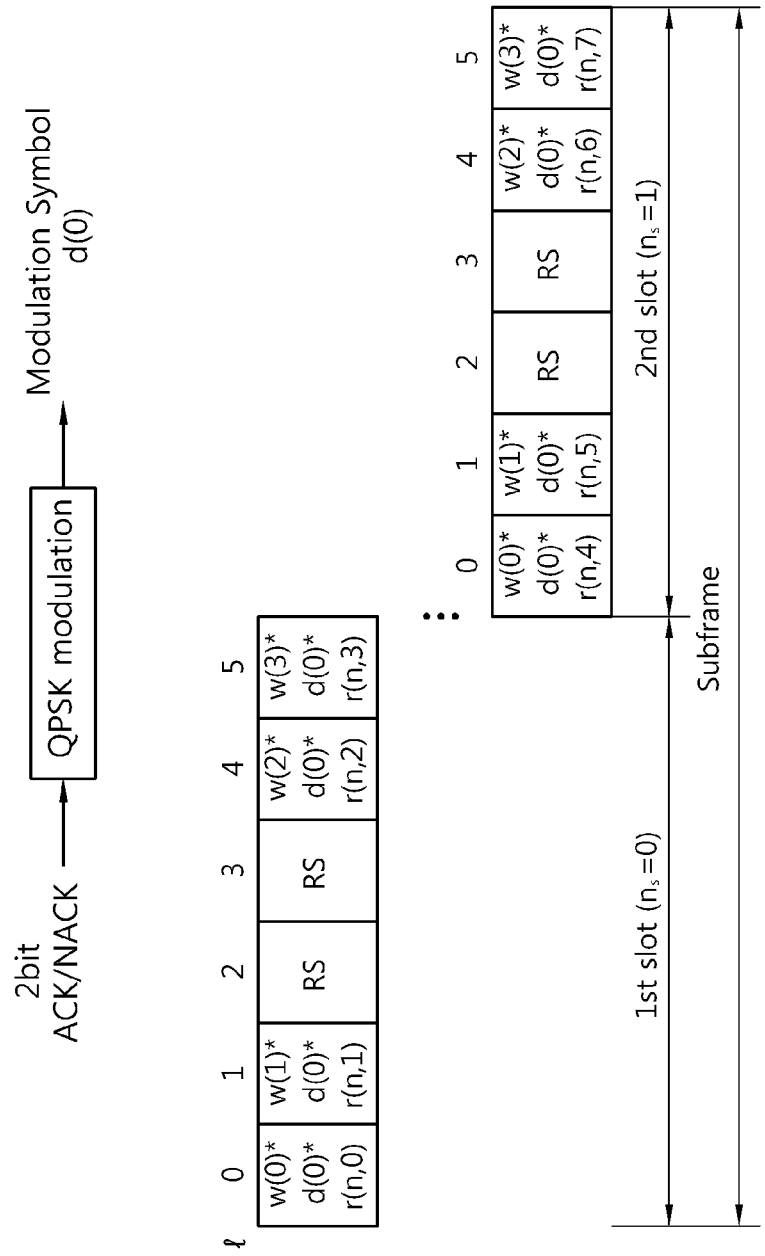
FIG. 6 shows a PUCCH format 1 in an extended CP in 3GPP LTE.

FIG. 5 shows the PUCCH format 1 in a normal CP in 3GPP LTE, and FIG. 6 shows the PUCCH format 1 in an extended CP in 3GPP LTE. The normal CP and the extended CP have different positions and numbers of reference signals (RS) because the number of OFDM symbols included in one slot is different, but have the same ACK/NACK transmission structure.

An ACK/NACK signal of 2 bits is subjected to QPSK (Quadrature Phase Shift Keying) modulation, and thus one modulation symbols $d(0)$ is generated. In the normal CP or the extended CP, 5 OFDM symbols exist in one slot in order to transmit the ACK/NACK signal. One subframe includes a total of 10 OFDM symbols in order to transmit the ACK/NACK signal. The modulation symbols $d(0)$ is spread into the cyclic-shifted sequence $r(n, I_{cs})$. In a subframe, assuming that a one-dimensional spread sequence corresponding to an $(i+1)^{th}$ OFDM symbol is $m(i)$, $\{m(0), m(1), \ldots, m(9)\}$ may be represented by $\{m(0), m(1), \ldots, m(9)\} = \{d(0)r(n,I_{cs}), d(0)r(n,I_{cs}), \ldots, d(0)r(n,I_{cs})\}$.

In order to increase a UE capacity, the one-dimensional spread sequence may be spread using an orthogonal sequence. An orthogonal sequence $w_i(k)$ (i is a sequence index, $0 \le k \le K-1$) having a spreading factor K=4 uses the following sequence.

TABLE 3

| Index | [w(0), w(1), w(2), w(3)] |
|---|---|
| 0 | [+1, +1, +1, +1] |
| 1 | [+1, −1, +1, −1] |
| 2 | [+1, −1, −1, +1] |

An orthogonal sequence $w_i(k)$ (i is a sequence index, $0 \le k \le K-1$) having a spreading factor K=3 uses the following sequence.

TABLE 4

| Index | [w(0), w(1), w(2)] |
|---|---|
| 0 | [+1, +1, +1] |
| 1 | [+1, $e^{j2\pi/3}$, $e^{j4\pi/3}$] |
| 2 | [+1, $e^{j4\pi/3}$, $e^{j2\pi/3}$] |

A different spreading factor may be used in each slot. In 3GPP LTE, in order to transmit an SRS (sounding reference signal), the last OFDM symbol within a subframe is used. Here, the first slot of a PUCCH uses a spreading factor K=4 and the second slot thereof uses a spreading factor K=3.

Accordingly, when a specific orthogonal sequence index is given, a two-dimensional spread sequences $s(0)$, $s(1)$, $s(9)$ may be represented as follows.

$\{s(0), s(1), \ldots, s(9)\} = \{w(0)m(0), w(1)m(1), w(2)m(2), w(3)m(3), w(4)m(4), w(0)m(5), w(1)m(7), w(2)m(8), w(3)m(9)\}$ The cyclic shift index $I_{cs}$ may vary according to a slot number ($n_s$) within a radio frame or a symbol index (l) within a slot or both. Assuming that the first cyclic shift index is 0 and the value of the cyclic shift index is increased every OFDM symbol, as shown in FIGS. 5 and 6, the two-dimensional spread sequences may be represented as follows.

$\{s(0), s(1), \ldots, s(9)\} = \{w(0)d(0)r(n,0), w(1)d(1)r(n,1), \ldots, w(3)d(9)r(n,9)\}$ The two-dimensional spread sequences $\{s(0), s(1), \ldots, s(9)\}$ are subjected to IFFT and then transmitted through a corresponding resource block. Accordingly, the ACK/NACK signal is transmitted on the PUCCH.

The transmission of a CQI in the PUCCH format 2 is described below. Hereinafter, the CQI is only an example of an uplink control signal transmitted through the PUCCH format 2, and the CQI may include a wideband CQI, a sub-band CQI, a PMI (precoding matrix indication) indicative of the index of a precoding matrix and/or an RI (rank indication) indicative of a rank.

Figure 7:
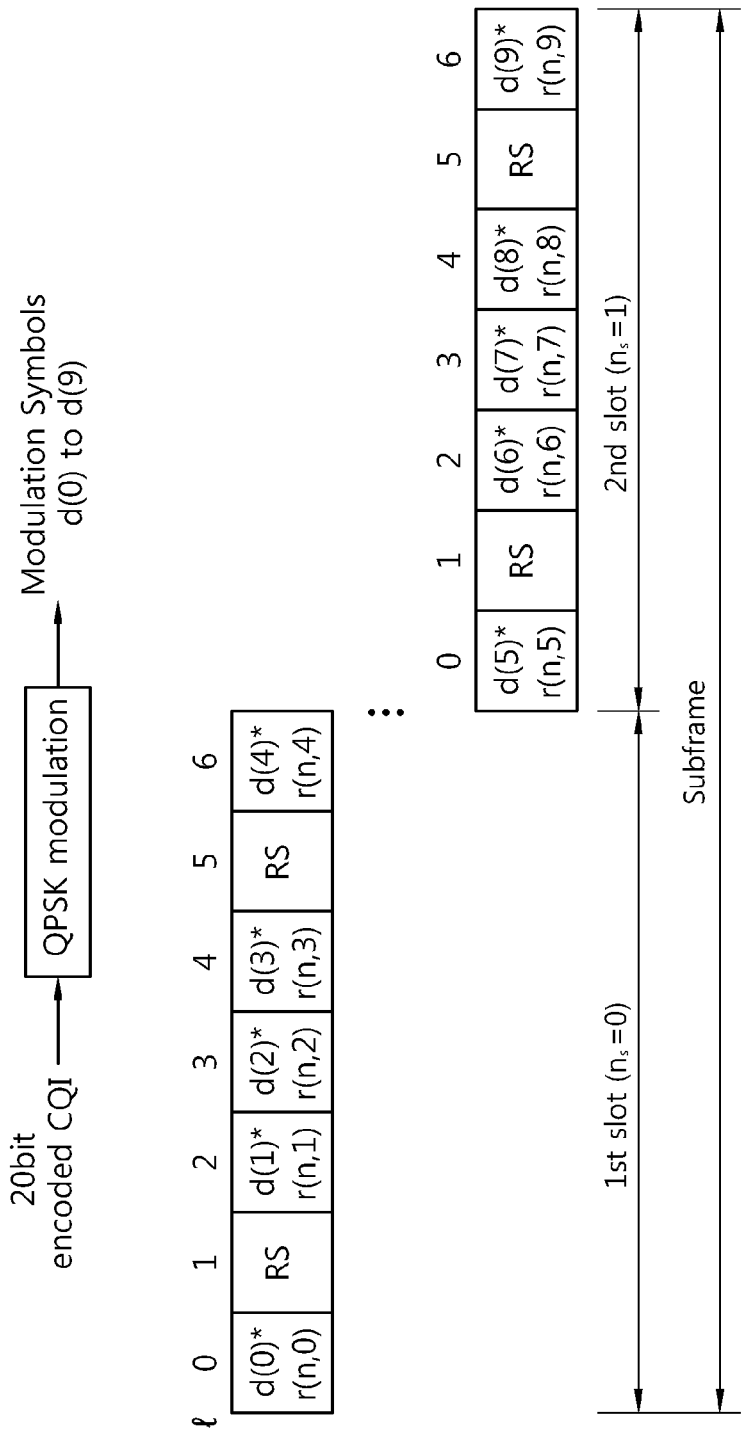
FIG. 7 shows a PUCCH format 2 in a normal CP in 3GPP LTE.
Figure 8:
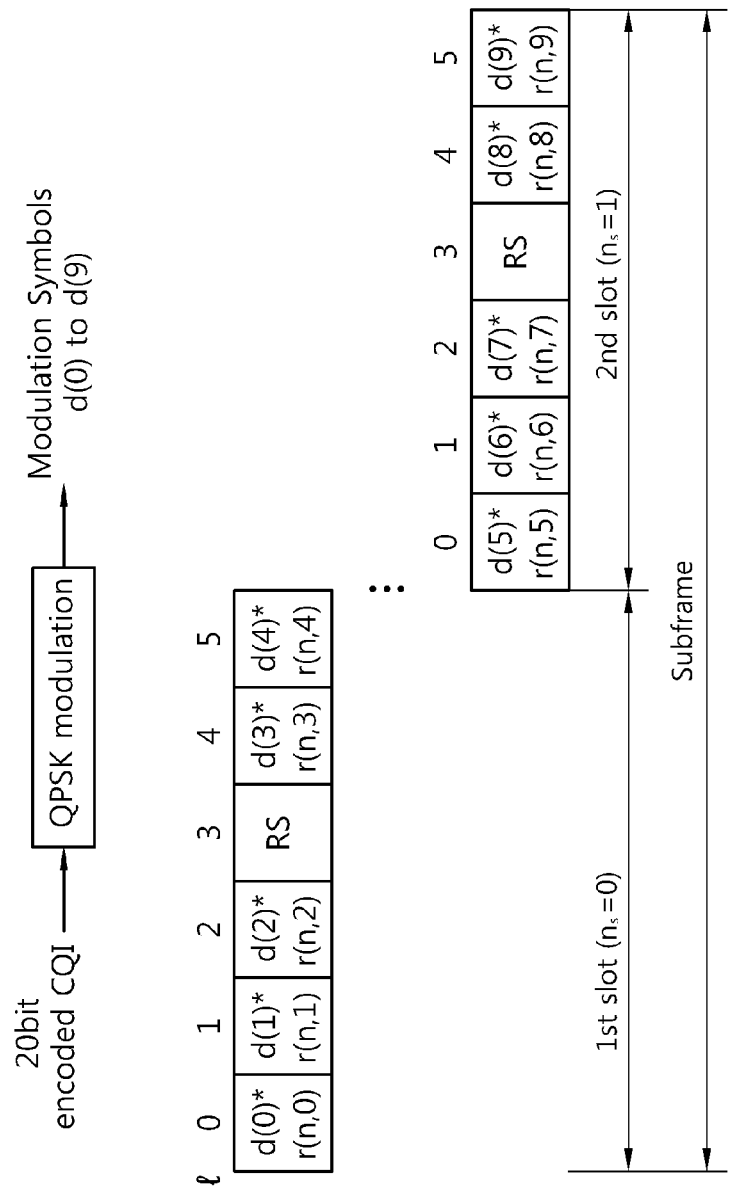
FIG. 8 shows a PUCCH format 2 in an extended CP in 3GPP LTE.

FIG. 7 shows the PUCCH format 2 in a normal CP in 3GPP LTE, and FIG. 8 shows the PUCCH format 2 in an extended CP in 3GPP LTE. The normal CP and the extended CP have different positions and numbers of reference signals (RS) because the number of OFDM symbols included in one slot is different, but have the same CQI structure.

An encoded CQI is generated by performing channel coding for CQI information bits $\{a_0, a_1, \ldots, a_{A-1}\}$. In 3GPP LTE, a (20, A) block code, such as that listed in the following table, is used for the channel coding of a CQI.

TABLE 5

| i | $M_{i,0}$ | $M_{i,1}$ | $M_{i,2}$ | $M_{i,3}$ | $M_{i,4}$ | $M_{i,5}$ | $M_{i,6}$ | $M_{i,7}$ | $M_{i,8}$ | $M_{i,9}$ | $M_{i,10}$ | $M_{i,11}$ | $M_{i,12}$ |
|---|---|---|---|---|---|---|---|---|---|---|---|---|---|
| 0 | 1 | 1 | 0 | 0 | 0 | 0 | 0 | 0 | 0 | 0 | 1 | 1 | 0 |
| 1 | 1 | 1 | 1 | 0 | 0 | 0 | 0 | 0 | 1 | 1 | 1 | 1 | 0 |
| 2 | 1 | 0 | 0 | 1 | 0 | 0 | 1 | 0 | 1 | 1 | 1 | 1 | 1 |
| 3 | 1 | 0 | 1 | 1 | 0 | 0 | 0 | 1 | 0 | 1 | 1 | 1 | 1 |
| 4 | 1 | 1 | 1 | 1 | 0 | 0 | 1 | 0 | 0 | 1 | 1 | 1 | 1 |
| 5 | 1 | 1 | 0 | 0 | 1 | 0 | 1 | 1 | 1 | 0 | 1 | 1 | 1 |
| 6 | 1 | 0 | 1 | 0 | 1 | 0 | 1 | 0 | 1 | 1 | 1 | 1 | 1 |
| 7 | 1 | 0 | 0 | 1 | 1 | 0 | 0 | 1 | 1 | 0 | 1 | 1 | 1 |
| 8 | 1 | 1 | 0 | 1 | 1 | 0 | 0 | 1 | 0 | 1 | 1 | 1 | 1 |
| 9 | 1 | 0 | 1 | 1 | 1 | 0 | 1 | 0 | 0 | 1 | 1 | 1 | 1 |
| 10 | 1 | 0 | 1 | 0 | 0 | 1 | 1 | 1 | 0 | 1 | 1 | 1 | 1 |
| 11 | 1 | 1 | 1 | 0 | 0 | 1 | 0 | 1 | 0 | 1 | 1 | 1 | 1 |
| 12 | 1 | 0 | 0 | 1 | 0 | 1 | 0 | 1 | 1 | 1 | 1 | 1 | 1 |

TABLE 5-continued

| i | $M_{i,0}$ | $M_{i,1}$ | $M_{i,2}$ | $M_{i,3}$ | $M_{i,4}$ | $M_{i,5}$ | $M_{i,6}$ | $M_{i,7}$ | $M_{i,8}$ | $M_{i,9}$ | $M_{i,10}$ | $M_{i,11}$ | $M_{i,12}$ |
|---|---|---|---|---|---|---|---|---|---|---|---|---|---|
| 13 | 1 | 1 | 0 | 1 | 0 | 1 | 0 | 1 | 0 | 1 | 1 | 1 | 1 |
| 14 | 1 | 0 | 0 | 0 | 1 | 1 | 0 | 1 | 0 | 0 | 1 | 0 | 1 |
| 15 | 1 | 1 | 0 | 0 | 1 | 1 | 1 | 1 | 0 | 1 | 1 | 0 | 1 |
| 16 | 1 | 1 | 1 | 0 | 1 | 1 | 1 | 0 | 0 | 1 | 0 | 1 | 1 |
| 17 | 1 | 0 | 0 | 1 | 1 | 1 | 0 | 0 | 1 | 0 | 0 | 1 | 1 |
| 18 | 1 | 1 | 0 | 1 | 1 | 1 | 1 | 1 | 0 | 0 | 0 | 0 | 0 |
| 19 | 1 | 0 | 0 | 0 | 0 | 1 | 1 | 0 | 0 | 0 | 0 | 0 | 0 |

Here, $M_{i,n}$ is a base sequence ($0 \le n \le 12$, n is an integer), and A is the size of CQI information bits (they becomes the payload of the PUCCH format 2 which is a maximum of 12). It is meant that in 3GPP LTE, the payload of the PUCCH format 2 is a maximum of 13 bits and an encoded CQI of 20 bits is always generated irrespective of the size of a used payload.

The encoded CQI $\{b_0, b_1, \ldots, b_{19}\}$ may be represented by the following equation.

$$b_i = \sum_{n=0}^{A-1}(a_n \cdot M_{i,n}) \bmod 2, \quad \text{where } i = 0, 1, 2, \ldots, 19 \qquad [\text{Equation 3}]$$

Although not shown in FIGS. 7 and 8, the encoded CQI of 20 bits may be scrambled by a UE-specific scrambling sequence or a cell-specific sequence.

Ten modulation symbols $d(0), \ldots, d(9)$ are generated from the encoded CQI of 20 bits through QPSK (Quadrature Phase Shift Keying) modulation. A total of 10 OFDM symbols exist in one subframe for CQI transmission because there are 5 OFDM symbols in one slot for CQI transmission in the normal CP or the extended CP. Accordingly, the 10 modulation symbols are generated so that one modulation symbol corresponds to one OFDM symbol.

The modulation symbols corresponding to the respective OFDM symbols are spread into the cyclic-shifted sequence $r(n, I_{cs})$. Assuming that a spread sequence corresponding to an $(i+1)^{th}$ OFDM symbol in a subframe is $s(i)$, The spread sequence may be represented as follows.

$\{s(0), s(1), \ldots, s(9)\} = \{d(0)r(n, I_{cs}), d(1)r(n, I_{cs}), \ldots, d(9)r(n, I_{cs})\}$ The cyclic shift index $I_{cs}$ may vary according to the slot number ($n_s$) within a radio frame or the symbol index (l) within a slot. Assuming that the first cyclic shift index is 0 and the value of the cyclic shift index is increased every OFDM symbol, as shown in FIGS. 7 and 8, The spread sequence may be represented as follows.

$\{s(0), s(1), \ldots, s(9)\} = \{d(0)r(n,0), d(1)r(n,1), \ldots, d(9)r(n,9)\}$

The spread sequences $\{s(0), s(1), \ldots, s(9)\}$ are subjected to IFFT through a corresponding resource block and then transmitted through the corresponding resource block. Accordingly, the CQI is transmitted on the PUCCH.

In the PUCCHs of 3GPP LTE, a BS distinguishes PUCCHs, received from UEs, from each other based on different cyclic shifts or different orthogonal sequences or both in the same resource block or different resource blocks. For example, a first UE transmits a CQI based on a first cyclic-shifted sequence and a second UE transmits a CQI based on a second cyclic-shifted sequence, so that the PUCCHs of a plurality of UEs are multiplexed into the same resource block. If the number of available cyclic shifts is 12, a total of 12 UEs may be multiplexed into one resource block. If the number of available cyclic shifts is 12 and three orthogonal sequences are used, a total of 36 UEs may be multiplexed into one resource block.

In order for a UE to configure the PUCCH format 1, the orthogonal sequence index, the cyclic shift index $I_{cs}$, and the resource block index m have to be known. Furthermore, in order for a UE to configure the PUCCH format 2, the cyclic shift index $I_{cs}$ and the resource block index m have to be known. According to 3GPP TS 36.211 V8.4.0 (2008-09), a BS informs a UE of one resource index $n_{PUCCH}^{(2)}$ so that the UE can obtain the cyclic shift index $I_{cs}$ and the resource block index m based on the resource index $n_{PUCCH}^{(2)}$.

A method of increasing the payload of a control channel through a resource selection scheme is described below.

For a clear description, a method of increasing the payload in the PUCCH format 2 in which a maximum payload is 13 bits is described as an example. However, the technical spirit of the present invention is not limited to the type of the control signal or the structure of the PUCCH format.

If K (I>1) resources are allocated, bits may be represented according to whether the resources are used (or selected). For example, K resources are allocated, and '0' or '1' of a bit $b_i$ may be represented according to whether an $i^{th}$ resource is used (or selected) (this is indicated by ON/OFF) in order to represent K bits $\{b_0, b_1, \ldots, b_{K-1}\}$. 'ON' of a resource indicates that the resource is selected (or transmitted with a certain level or higher), and 'OFF' of a resource indicates that the resource is not selected (or transmitted with a certain level or less).

Figure 9:
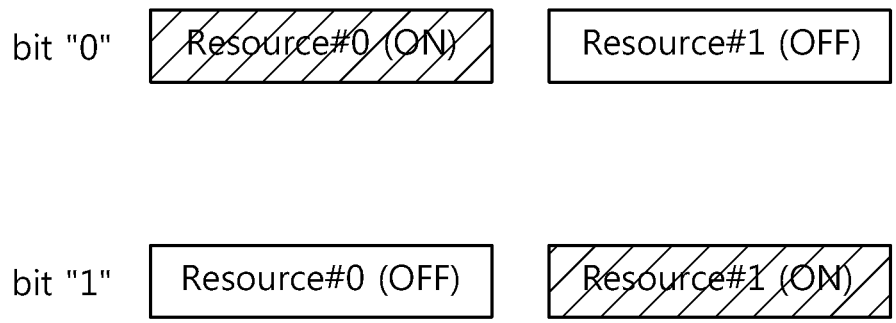
FIG. 9 shows the representation of a bit when two resources are allocated.
Figure 10:
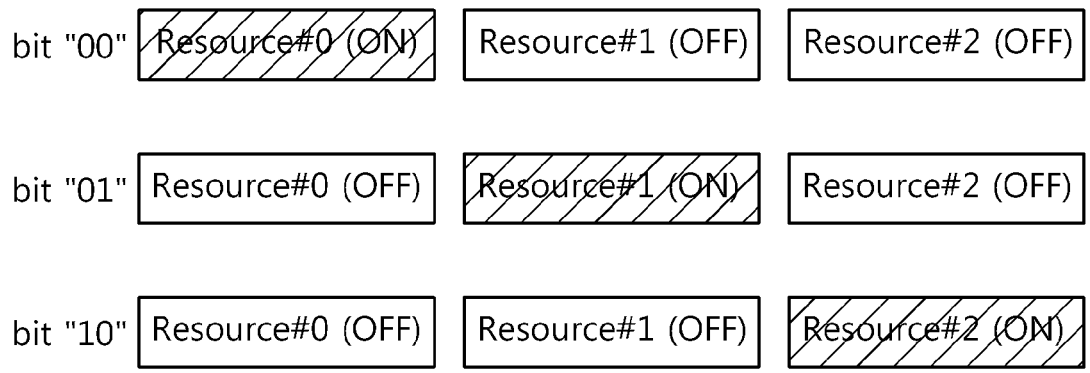
FIG. 10 shows the representation of a bit when three resources are allocated.
Figure 11:
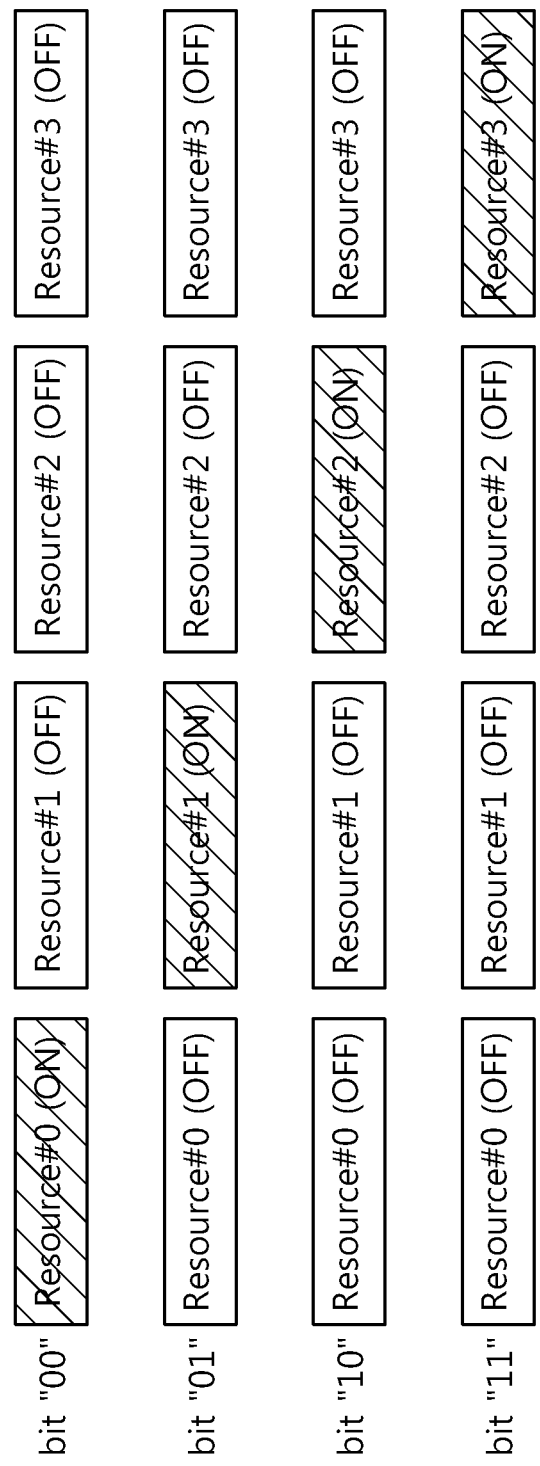
FIG. 11 shows the representation of a bit when four resources are allocated.

FIG. 9 shows the representation of a bit when two resources are allocated. When a resource #0 and a resource #1 are allocated, information bit of '0' or '1' may be represented according to ON/OFF of the resource #0 or the resource #1. Here, the bit '0' is indicated by ON of the resource #0 and OFF of the resource #1, and the bit '1' is indicated by OFF of the resource #0 and ON of the resource #1. However, the bit value or the sequence of the resources is only illustrative. Likewise, FIG. 10 shows the representation of a bit when three resources are allocated, and FIG. 11 shows the representation of a bit when four resources are allocated.

A relationship between the ON/OFF of a resource and an information bit may be previously determined, or a BS may inform a UE of the relationship through signaling. A BS may inform a UE of the relationship through system information, a PDCCH and/or an RRC message. Alternatively, resource indices may be arranged in a descending order, and the relationship may be defined according to the resource indices.

A BS may allocate a plurality of resources to a UE using a variety of methods. If two resources are used, a UE may determine the first resource using the existing allocation method and may determine the second resource through RRC signaling or predetermined mapping. For example, the second resource may be allocated at a predetermined interval based on the first resource. The RRC signaling may be a cell-common message, a cell-specific message, and a UE-specific message. The RRC signaling may include not only an RRC layer, but also a physical layer message and an MAC layer message.

An example in which a scheme using the resource selection scheme is applied to the PUCCH format 2 in a multi-antenna system is disclosed in detail.

For a clear description, it is assumed that a resource is a cyclic shift and a resource index is a cyclic shift index. Those skilled in the art, however, may apply the technical spirit of the present invention to any resource used to configure control channels, such as an orthogonal sequence, a resource block, a frequency domain resource, a time domain resource, a code region resource, and a combination of them.

In order to configure the PUCCH format 2, one cyclic shift index $I_{cs1}$ and one resource block index m are required. In a proposed embodiment, the payload of the PUCCH format 2 is increased using an additional cyclic shift index $I_{cs2}$. To selectively use two cyclic shift indices according to a bit is called a resource selection scheme. The two cyclic shift indices are only an example, and a plurality of cyclic shift indices may be allocated.

A BS may inform a UE of the additional cyclic shift index $I_{cs2}$ using a variety of methods. The BS may use system information, a PDCCH and/or RRC signaling. Alternatively, the UE may obtain the cyclic shift index $I_{cs1}$, the cyclic shift index $I_{cs2}$, and the resource block index m based on the existing resource index $n_{PUCCH}^{(2)}$. Alternatively, the additional cyclic shift index $I_{cs2}$ may have a certain offset from the cyclic shift index $I_{cs1}$. The offset value may be previously set, or a BS may inform a UE of the offset value.

It is hereinafter assumed that the first cyclic shift index $I_{cs1}$ and the second cyclic shift index $I_{cs2}$ use the same resource block index m. If the same resource block index is used, the existing resource block pair may be used without change. However, a plurality of cyclic shift indices may use different resource block indices.

For a clear description, only two resources and two transmission antennas are hereinafter taken into consideration, but this is only illustrative. Those skilled in the art may apply the technical spirit of the present invention to a plurality of resources and a plurality of transmission antennas.

Figure 12:
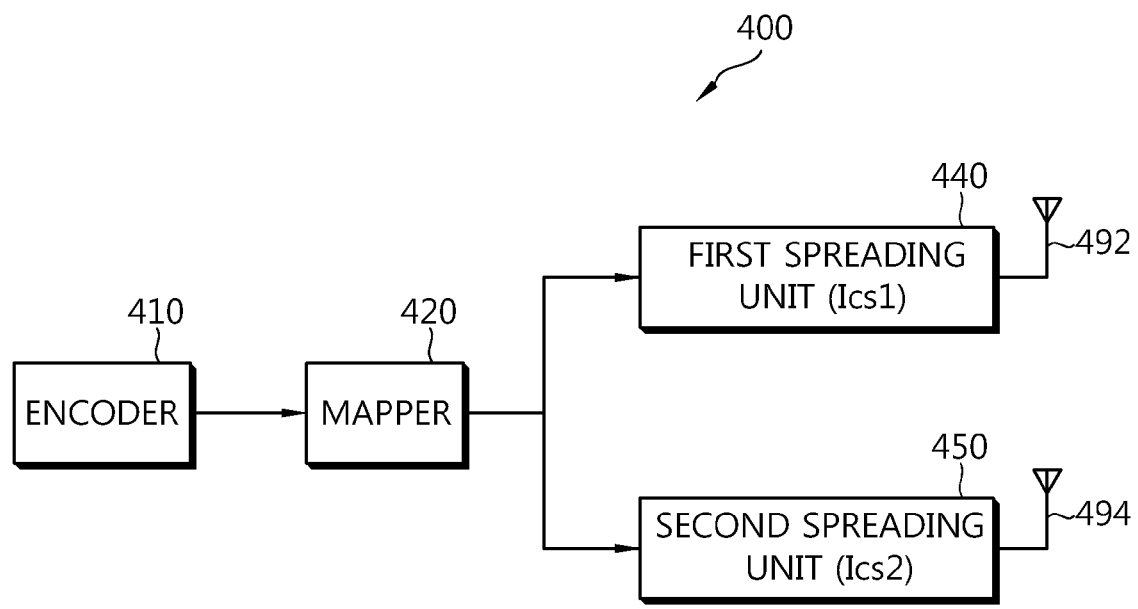
FIG. 12 is a block diagram of a transmitter implementing a spatial orthogonal resource transmission scheme.

FIG. 12 is a block diagram of a transmitter implementing a spatial orthogonal resource (hereinafter referred to as SOR) transmission scheme. A transmitter 400 includes an encoder 410, a mapper 420, a first spreading unit 440, a second spreading unit 450, and two transmission antennas 492 and 494.

The encoder 510 receives information bits and generates encoded bits based on the received information bits. The mapper 520 generates modulation symbols by mapping the encoded bits on a constellation using the resource selection scheme. The modulation symbol is hereinafter said to be a complex-valued symbol indicating a position on the constellation of a relevant encoded bit, but the modulation symbols may be represented in various forms according to an implementation method. The mapper 520 may generate the modulation symbols on the basis of a plurality of resources, corresponding to n (n≥1) bits of the m encoded bits, and PSK (Phase Shift Keying) of a $2^{(m-n)}$ order or QAM (quadrature amplitude modulation) of a $2^{(m-n)}$ order, corresponding to (m−n) bits, on the constellation. This is described in more detail below.

The modulation symbols are inputted to the first spreading unit 440 and the second spreading unit 450 according to corresponding resources. That is, the modulation symbols are inputted to the first spreading unit 440 when they correspond to the first cyclic shift index $I_{cs1}$ according to a cyclic shift index to which the modulation symbols belong. The modulation symbols are inputted to the second spreading unit 450 when they correspond to the second cyclic shift index $I_{cs2}$ according to a cyclic shift index to which the modulation symbols belong. The first spreading unit 440 spreads the modulation symbols into a cyclic-shifted sequence according to the first cyclic shift index, and the second spreading unit 440 spreads the modulation symbols into a cyclic-shifted sequence according to the second cyclic shift index. The spread sequence generated by the first spreading unit 440 is transmitted through the first transmission antenna 492, and the spread sequence generated by the second spreading unit 450 is transmitted through the second transmission antenna 494.

The modulation symbols are transmitted through different antennas according to orthogonal resources (here, cyclic shift indices) to which they belong. Accordingly, this method is called the SOR method in that a PUCCH is transmitted through an orthogonal resource allocated to each antenna.

Figure 13:
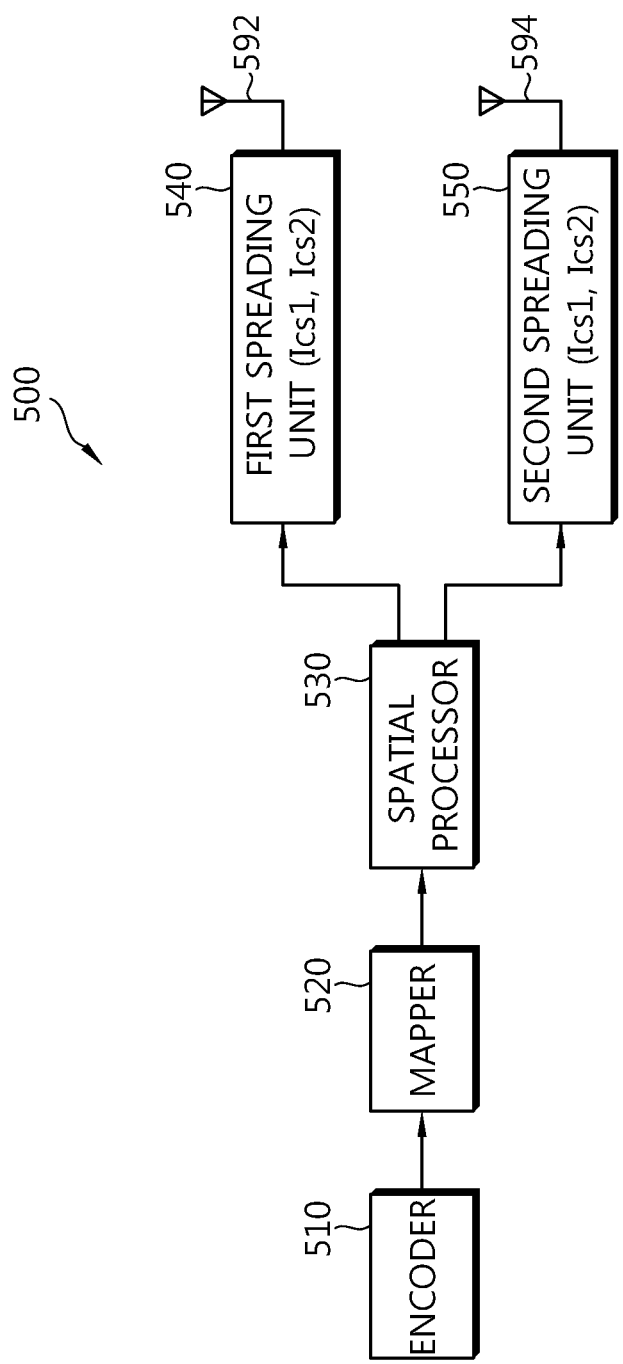
FIG. 13 is a block diagram of a transmitter implementing an SCBC.

FIG. 13 is a block diagram of a transmitter implementing an SCBC (Space-Code Block Code). The transmitter 500 includes an encoder 510, a mapper 520, a spatial processor 530, a first spreading unit 540, a second spreading unit 550, and two transmission antennas 592 and 594.

The encoder 510 generates encoded bits based on received information bit. The mapper 520 generates modulation symbols by mapping the encoded bits on a constellation using the resource selection scheme. The mapper 520 may generate the modulation symbols on the basis of a plurality of resources, corresponding to n (n≥1) bits of the m encoded bits, and PSK (Phase Shift Keying) of a $2^{(m-n)}$ order or QAM of a $2^{(m-n)}$ order, corresponding to (m−n) bits, on the constellation.

The spatial processor 540 generates a transmission symbol by processing an SCBC for the modulation symbols and sends the transmission symbol to the first spreading unit 540 and the second spreading unit 550. The first spreading unit 540 and the second spreading unit 550 spread the transmission symbol into indices cyclically shifted according to their cyclic shift indices corresponding to the transmission symbol. A spread sequence generated by the first spreading unit 540 is transmitted through the first transmission antenna 592, and a spread sequence generated by the second spreading unit 550 is transmitted through the second transmission antenna 594.

The construction and operation of the SCBC are described in detail through an application example of the PUCCH format 2.

First Embodiment

Backward compatibility with the existing LTE is first taken into consideration.

As shown in Table 5, in the existing PUCCH format 2, a maximum size of the payload is 13 bits. Accordingly, when the size of the CQI information bits is 13 bits or less, the existing PUCCH format 2 is used without change. When the size of the CQI information bits is greater than 13 bits, the resource selection scheme may be applied to bits greater than 13 bits.

Exemplary applications to the proposed resource selection scheme and SOR/SCBC are described in more detail below. The size of the payload, the number of allocated cyclic shift indices, and the number of encoded bits are only exemplary.

It is assumed that the size of CQI information bits to be transmitted is 18 bits and two cyclic shift indices $I_{cs1}$ and $I_{cs2}$ are allocated. 13 bits of the 18 bits are encoded through block coding and the remaining 5 bits use the resource selection scheme.

More particularly, the following CQI information bits of 18 bits are assumed.

<0,1,1,0,1,0,0,1,1,1,1,0,1,1,1,1,1,0>

It is assumed that the former 13 bits <0,1,1,0,1,0,0,1,1,1,1,0,1> use block coding and the remaining 5 bits <1,1,1,1,0> use the resource selection scheme, for convenience sake.

When the block coding of Table 5 is used, the encoded bits are as follows.

<0,0, 0,0, 1,0, 0,1, 0,1, 1,1, 1,1, 0,0, 1,1, 1,0>

When the resource selection scheme of FIG. 9 is used, if the bit is '0', the first cyclic shift $I_{cs1}$ is ON and the second cyclic shift $I_{cs2}$ is OFF. If the bit is '1', the first cyclic shift $I_{cs1}$ is OFF and the second cyclic shift $I_{cs2}$ is ON. Resource indices selected for the remaining 5 bits <1,1,1,1,0> are as follows.

<$I_{cs2}, I_{cs2}, I_{cs2}, I_{cs2}, I_{cs1}$>

It is assumed that QPSK mapping of Table 6 below is used for the encoded bits of the former 13 bits.

TABLE 6

| b(i), b(i + 1) | I | Q |
|---|---|---|
| 00 | $1/\sqrt{2}$ | $1/\sqrt{2}$ |
| 01 | $1/\sqrt{2}$ | $-1/\sqrt{2}$ |
| 10 | $-1/\sqrt{2}$ | $1/\sqrt{2}$ |
| 11 | $-1/\sqrt{2}$ | $-1/\sqrt{2}$ |

When the encoded bits are subjected to QPSK modulation, mapped modulation symbols d(0), . . . , d(9) are the same as the following table.

TABLE 7

| | d(0) | d(1) | d(2) | d(3) | d(4) | d(5) | d(6) | d(7) | d(8) | d(9) |
|---|---|---|---|---|---|---|---|---|---|---|
| I | $1/\sqrt{2}$ | $1/\sqrt{2}$ | $-1/\sqrt{2}$ | $1/\sqrt{2}$ | $1/\sqrt{2}$ | $-1/\sqrt{2}$ | $-1/\sqrt{2}$ | $1/\sqrt{2}$ | $-1/\sqrt{2}$ | $-1/\sqrt{2}$ |
| Q | $1/\sqrt{2}$ | $1/\sqrt{2}$ | $1/\sqrt{2}$ | $-1/\sqrt{2}$ | $-1/\sqrt{2}$ | $-1/\sqrt{2}$ | $-1/\sqrt{2}$ | $1/\sqrt{2}$ | $-1/\sqrt{2}$ | $1/\sqrt{2}$ |

When 5 selected resource indices are made to correspond to 5 OFDM symbols included in a first slot, respectively, and the first cyclic shift index $I_{cs1}$ is allocated to a second slot, spread sequences s(0), . . . , s(9) for single antenna transmission may be represented as follows.

First example: {s(0), s(1), . . . , s(9)}={d(0)r(n,$I_{cs2}$), d(1)r(n,$I_{cs2}$), d(2)r(n,$I_{cs2}$), d(3)r(n,$I_{cs2}$), d(4)r(n,$I_{cs1}$), d(5)r(n,$I_{cs1}$), d(6)r(n,$I_{cs1}$), d(7)r(n,$I_{cs1}$), d(8)r(n,$I_{cs1}$), d(9)r(n,$I_{cs1}$)}

Alternatively, the 5 selected resource indices may be repeatedly applied to the second slot. This may be represented as follows.

Second example: {s(0), s(1), . . . , s(9)}={d(0)r(n,$I_{cs2}$), d(1)r(n,$I_{cs2}$), d(2)r(n,$I_{cs2}$), d(3)r(n,$I_{cs2}$), d(4)r(n,$I_{cs1}$), d(5)r(n,$I_{cs2}$), d(6)r(n,$I_{cs2}$), d(7)r(n,$I_{cs2}$), d(8)r(n,$I_{cs2}$), d(9)r(n,$I_{cs1}$)}

For another example, the resource selection scheme may be repeatedly applied in a symbol level. Here, the spread sequences s(0), . . . , s(9) may be represented as follows.

Third example: {s(0), s(1), . . . , s(9)}={d(0)r(n,$I_{cs2}$), d(1)r(n,$I_{cs2}$), d(2)r(n,$I_{cs2}$), d(3)r(n,$I_{cs2}$), d(4)r(n,$I_{cs2}$), d(5)r(n,$I_{cs2}$), d(6)r(n,$I_{cs2}$), d(7)r(n,$I_{cs2}$), d(8)r(n,$I_{cs1}$), d(9)r(n,$I_{cs1}$)}

That is, <$I_{cs2}, I_{cs2}, I_{cs2}, I_{cs2}, I_{cs2}, I_{cs2}, I_{cs2}, I_{cs2}, I_{cs1}, I_{cs1}$> are used by repeating <$I_{cs2}, I_{cs2}, I_{cs2}, I_{cs2}, I_{cs1}$> in the unit of a symbol.

The above examples may be combined and used. A UE may use a previously designated type according to the number of bits or a channel state in which the resource selection scheme is used. Alternatively, a BS may select a type and inform a UE of the selected type through signaling.

Whether to apply the resource selection scheme may be determined according to the size of a payload necessary for a channel. For example, when the size of a required payload is 13 bits or less, the existing PUCCH format 2 may be used without change. If the size of a required payload is greater than 13 bits, constellation mapping using the proposed resource selection scheme may be used.

Whether to apply the resource selection scheme may be determined according to the number of resources allocated to a channel. If the number of allocated resource is 1, the existing PUCCH format 2 may be used without change. If the number of allocated resource is 2 or more, constellation mapping using the proposed resource selection scheme may be used. Assuming that a second resource is determined on the basis of a first resource, if the second resource is the same as the first resource, the existing PUCCH format 2 may be used without change. If the second resource is not the same as the first resource, constellation mapping using the proposed resource selection scheme may be used.

A BS may inform a UE whether to apply the resource selection scheme through RRC signaling.

The cyclic shift indices $I_{cs1}$ and $I_{cs2}$ may use symbol level hopping or slot level hopping or both. In the symbol level hopping or the slot level hopping, allocated cyclic shift indices may be used by shifting the cyclic shift indices in the unit of a symbol or slot or both on the basis of the allocated cyclic shift indices. For example, the selected cyclic shift indices <$I_{cs2}, I_{cs2}, I_{cs2}, I_{cs2}, I_{cs1}$> in the above example may be used as <$I_{cs2}(0), I_{cs2}(1), I_{cs2}(2), I_{cs2}(3), I_{cs1}(4)$> through the symbol level hopping. $I_{cs2}(m)$ means the cyclic shift index obtained for an $m^{th}$ OFDM symbol on the basis of $I_{cs2}$. This may also be applied to embodiments below.

For a clear description, the symbols/slot level hopping of cyclic shift indices are omitted.

Figure 14:
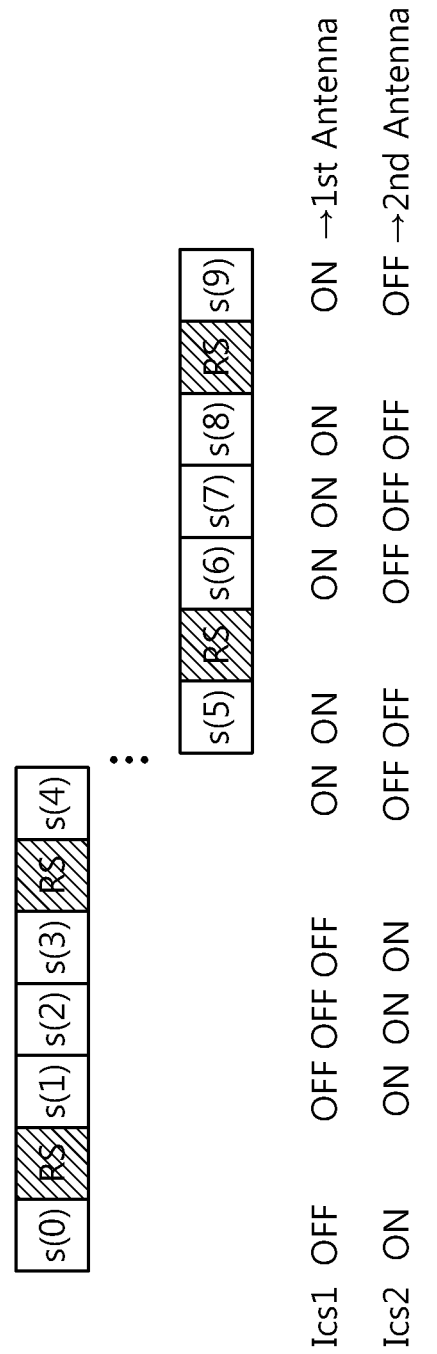
FIG. 14 shows an application of a first example to an SOR.

FIG. 14 shows an application of the first example to an SOR. Spread sequences s(4), s(5), s(6), s(7), s(8), and s(9) using the first cyclic shift index $I_{cs1}$ are transmitted through a first antenna, and spread sequences s(0), s(1), s(2), and s(3) using the second cyclic shift index $I_{cs2}$ are transmitted through a second antenna.

An application to an SCBC is now described. At least one of the SCBCs as listed in the following table is used on the basis of an Alamouti matrix.

TABLE 8

| (1) | $\begin{pmatrix} s_1 & s_2 \\ -s_2^* & s_1^* \end{pmatrix}$ | (2) | $\begin{pmatrix} s_1 & -s_2 \\ s_2^* & s_1^* \end{pmatrix}$ |
|---|---|---|---|
| (3) | $\begin{pmatrix} s_1^* & s_2 \\ -s_2^* & s_1 \end{pmatrix}$ | (4) | $\begin{pmatrix} s_1^* & -s_2 \\ s_2^* & s_1 \end{pmatrix}$ |
| (5) | $\begin{pmatrix} s_1 & s_2^* \\ -s_2 & s_1^* \end{pmatrix}$ | (6) | $\begin{pmatrix} s_1 & -s_2^* \\ s_2 & s_1^* \end{pmatrix}$ |
| (7) | $\begin{pmatrix} s_1^* & s_2^* \\ -s_2 & s_1 \end{pmatrix}$ | (8) | $\begin{pmatrix} s_1^* & -s_2^* \\ s_2 & s_1 \end{pmatrix}$ |

TABLE 8-continued

| | | | |
|---|---|---|---|
| (9) | $\begin{pmatrix} s_1 & s_2 \\ s_2^* & -s_1^* \end{pmatrix}$ | (10) | $\begin{pmatrix} -s_1 & s_2 \\ s_2^* & s_1^* \end{pmatrix}$ |
| (11) | $\begin{pmatrix} s_1 & s_2^* \\ s_2 & -s_1^* \end{pmatrix}$ | (12) | $\begin{pmatrix} -s_1 & s_2^* \\ s_2 & s_1^* \end{pmatrix}$ |
| (13) | $\begin{pmatrix} s_1^* & s_2 \\ s_2^* & -s_1 \end{pmatrix}$ | (14) | $\begin{pmatrix} -s_1^* & s_2 \\ s_2^* & s_1 \end{pmatrix}$ |
| (15) | $\begin{pmatrix} s_1^* & s_2^* \\ s_2 & -s_1 \end{pmatrix}$ | (16) | $\begin{pmatrix} -s_1^* & s_2^* \\ s_2 & s_1 \end{pmatrix}$ |

FIG. 15 is an exemplary diagram illustrating the meaning of an SCBC. Each row of an SCBC matrix indicates a resource (i.e., a cyclic shift index) and each column thereof indicates an antenna.

The antenna is also called an antenna port, and the antenna may mean a physical antenna, but may mean a logical antenna or a layer. The layer is a logical path of information, and the number of layers corresponds to the value of a rank.

In the present example, a first column indicates a first antenna, and a second column indicates a second antenna. $s_1$ in the first column indicates a transmission symbol corresponding to a first cyclic shift index in the first antenna, and $s_2$ in the first column indicates a transmission symbol corresponding to a second cyclic shift index in the first antenna. In the second column, $s_1$ and $s_2$ are changed in sequence. It means that the cyclic shift index in the first antenna and the cyclic shift index in the second antenna are changed. ( )* indicates a complex conjugate. Accordingly, in the symbol corresponding to the first cyclic shift index in the second antenna, a negative sign is attached to the complex conjugate.

In an SCBC, a resource corresponding to the transmission symbol in the first antenna and a resource corresponding to the modulation symbol in the second antenna are changed, and a transmission symbol is generated by performing processing such that the modulation symbol has a relationship of a complex conjugate or a negative complex conjugate between the first antenna and the second antenna.

FIG. 16 shows an example of processing of an SCBC matrix. d(0) using the second cyclic shift index $I_{cs2}$ n the first example is described as an example.

According to SCBC (6) in Table 8, a spread sequence of $d(0)r(n, I_{cs2})$ is transmitted through a first antenna, and a spread sequence of $-d(0)*r(n, I_{cs1})$ is transmitted through a second antenna. There is no change in the first antenna because a modulation symbol d(0) is a transmission symbol d(0), but in the second antenna, a transmission symbol is $-d(0)*$ which has a negative complex conjugate relationship with the transmission symbol of the first antenna.

According to SCBC (1) in Table 8, a spread sequence of $-d(0)*r(n, I_{cs2})$ in which a negative sign is attached to a complex conjugate is transmitted through a first antenna, and a spread sequence of $d(0)r(n, I_{cs1})$ using the first cyclic shift index is transmitted through a second antenna.

When the SCBC (1) of Table 8 is used, the spread sequences s(0), . . . , s(9) in the first example may be represented for each antenna.

First antenna: $\{s(0), s(1), \ldots, s(9)\} = \{-d(0)*r(n,I_{cs2}), -d(1)*r(n,I_{cs2}), -d(2)*r(n,I_{cs2}), -d(3)*r(n,I_{cs2}), d(4)r(n,I_{cs1}),$ $d(5)r(n,I_{cs1}), d(6)r(n,I_{cs1}), d(7)r(n,I_{cs1}), d(8)r(n,I_{cs1}), d(9)r(n,I_{cs1})\}$ Second antenna: $\{s(0), s(1), \ldots, s(9)\} = \{d(0)r(n,I_{cs1}), d(1)r(n,I_{cs1}), d(2)r(n,I_{cs1}), d(3)r(n,I_{cs1}), d(4)*r(n,I_{cs2}), d(5)r(n,I_{cs2}), d(6)r(n,I_{cs2}), d(7)r(n,I_{cs2}), d(8)r(n,I_{cs2}), d(9)r(n,I_{cs2})\}$ In the above configuration, the same operation as an SOR in which the first and the second cyclic shift indices are transmitted through different antennas is performed in the second slot.

When the SCBC (6) of Table 8 is used, the spread sequences s(0), . . . , s(9) in the first example may be represented as follows for each antenna.

First antenna: $\{s(0), s(1), \ldots, s(9)\} = \{d(0)r(n,I_{cs2}), d(1)r(n,I_{cs2}), d(2)r(n,I_{cs2}), d(3)r(n,I_{cs2}), d(4)r(n,I_{cs1}), d(5)r(n,I_{cs1}), d(6)r(n,I_{cs1}), d(7)r(n,I_{cs1}), d(8)r(n,I_{cs1}), d(9)r(n,I_{cs1})\}$ Second antenna: $\{s(0), s(1), \ldots, s(9)\} = \{-d(0)*r(n,I_{cs1}), -d(1)*r(n,I_{cs1}), -d(2)*r(n,I_{cs1}), -d(3)*r(n,I_{cs1}), d(4)*r(n,I_{cs2}), d(5)r(n,I_{cs2}), d(6)r(n,I_{cs2}), d(7)r(n,I_{cs2}), d(8)r(n,I_{cs2}), d(9)r(n,I_{cs2})\}$ The following table shows another example of available SCBCs. Here, some elements of an SCBC matrix are set to 0. That is, the SCBC is processed for each resource of two allocated resources.

TABLE 9

| | | | |
|---|---|---|---|
| (1) | $\begin{pmatrix} s_1 & 0 \\ 0 & s_1^* \end{pmatrix}$ | (2) | $\begin{pmatrix} s_1^* & 0 \\ 0 & s_1 \end{pmatrix}$ |
| (3) | $\begin{pmatrix} s_1 & 0 \\ 0 & -s_1^* \end{pmatrix}$ | (4) | $\begin{pmatrix} s_1^* & 0 \\ 0 & -s_1 \end{pmatrix}$ |
| (5) | $\begin{pmatrix} -s_1 & 0 \\ 0 & s_1^* \end{pmatrix}$ | (6) | $\begin{pmatrix} -s_1^* & 0 \\ 0 & s_1 \end{pmatrix}$ |
| (7) | $\begin{pmatrix} 0 & s_2 \\ -s_2^* & 0 \end{pmatrix}$ | (8) | $\begin{pmatrix} 0 & s_2^* \\ -s_2 & 0 \end{pmatrix}$ |
| (9) | $\begin{pmatrix} 0 & -s_2 \\ s_2^* & 0 \end{pmatrix}$ | (10) | $\begin{pmatrix} 0 & -s_2^* \\ s_2 & 0 \end{pmatrix}$ |
| (11) | $\begin{pmatrix} 0 & s_2 \\ s_2^* & 0 \end{pmatrix}$ | (12) | $\begin{pmatrix} 0 & s_2^* \\ s_2 & 0 \end{pmatrix}$ |

It is assumed that $s_1$ is a symbol using a first resource and $s_2$ is a symbol using a second resource. The symbol $s_1$ selected to use the first resource is processed using any one of the SCBC matrices (1) to (6), and the symbol $s_2$ selected to use the second resource is processed using any one of the SCBC matrices (7) to (12).

In Table 9, the SCBC matrices may be used in pairs. The SCBC matrix (1) may be paired with any one of the SCBC matrices (7), (8), (9), and (10) and used. The SCBC matrix (2) may be paired with any one of the SCBC matrices (7), (8), (9), and (10) and used. The SCBC matrix (11) may be paired with any one of the SCBC matrices (3), (4), (5), and (6) and used. The SCBC matrix (12) may be paired with any one of the SCBC matrices (3), (4), (5), and (6).

If one symbol $s_1$ uses a first cyclic shift index, the first cyclic shift index is transmitted through a first antenna and a second cyclic shift index is transmitted through a second antenna. For example, according to the SCBC (10) in Table 9, $d(0)r(n,I_{cs1})$ is transmitted through the first antenna and $-d(0)^*r(n,I_{cs2})$ is transmitted through the second antenna.

In the PUCCH format 2, 10 OFDM symbols are used for CQI transmission. Accordingly, if 2 cyclic shifts are allocated, an additional payload of 10 bits can be transmitted using the resource selection scheme. Accordingly, the PUCCH format 2 according to the proposed structure can be used to transmit a payload of a maximum of 23 bits (the existing 13 bits+the additional 10 bits). Furthermore, the existing low PAPR/CM characteristic can be maintained by selecting and using one of a plurality of cyclic-shifted sequences.

Furthermore, advantages of a multi-antenna system may be utilized by proposing a scheme for applying the resource selection scheme to an SOR or an SCBC or both. Compatibility with a UE using a single antenna in PUCCH transmission can be maintained.

Meanwhile, in the above examples, the existing block coding has been applied to 13 bits, and the resource selection scheme has been applied to the remaining 5 bits. Assuming that a payload to be transmitted is K bits, the resource selection scheme may be applied to 10 bits of the K bits, and the existing block coding scheme may be applied to the remaining (K-10) bits.

The following CQI information bits of 18 bits are assumed.
<0,1,1,0,1,0,0,1,1,1,1,0,1,1,1,1,1,0>

It is assumed that the resource selection scheme is applied to the former 10 bits <0,1,1,0,1,0,0,1,1,1> of the 18 bits and the existing block coding scheme is applied to the remaining 8 bits <1,0,1,1,1,1,1,0>.

When the resource selection scheme of FIG. 9 is used, selected resource indices corresponding to the 10 bits <0,1,1,0,1,0,0,1,1,1> are as follows.

<$I_{cs1}, I_{cs2}, I_{cs2}, I_{cs1}, I_{cs2}, I_{cs1}, I_{cs1}, I_{cs2}, I_{cs2}, I_{cs2}$>

When the block coding scheme of Table 5 is used, encoded bits are as follows.
<1,0, 1,1, 1,1, 0,1, 1,1, 0,0, 1,1, 1,0, 1,0, 1,1>

When QPSK modulation of Table 6 is performed for the encoded bits, mapped modulation symbols $d(0), \ldots, d(9)$, such as those listed in the following table, are obtained.

TABLE 10

| | d(0) | d(1) | d(2) | d(3) | d(4) | d(5) | d(6) | d(7) | d(8) | d(9) |
|---|---|---|---|---|---|---|---|---|---|---|
| I | $-1/\sqrt{2}$ | $-1/\sqrt{2}$ | $-1/\sqrt{2}$ | $1/\sqrt{2}$ | $-1/\sqrt{2}$ | $1/\sqrt{2}$ | $-1/\sqrt{2}$ | $-1/\sqrt{2}$ | $-1/\sqrt{2}$ | $-1/\sqrt{2}$ |
| Q | $1/\sqrt{2}$ | $-1/\sqrt{2}$ | $-1/\sqrt{2}$ | $-1/\sqrt{2}$ | $-1/\sqrt{2}$ | $1/\sqrt{2}$ | $-1/\sqrt{2}$ | $1/\sqrt{2}$ | $1/\sqrt{2}$ | $-1/\sqrt{2}$ |

Assuming that 5 selected resource indices are made to correspond to 5 OFDM symbols included in a first slot, respectively, and the first cyclic shift index $I_{cs1}$ is allocated to a second slot, the spread sequences $s(0), \ldots, s(9)$ for single antenna transmission may be represented as follows.

{$s(0), s(1), \ldots, s(9)$}={$d(0)r(n,I_{cs1}), d(1)r(n,I_{cs2}), d(2)r(n,I_{cs2}), d(3)r(n,I_{cs1}), d(4)r(n,I_{cs2}), d(5)r(n,I_{cs1}), d(6)r(n,I_{cs1}), d(7)r(n,I_{cs2}), d(8)r(n,I_{cs2}), d(9)r(n,I_{cs2})$}

Figure 17:
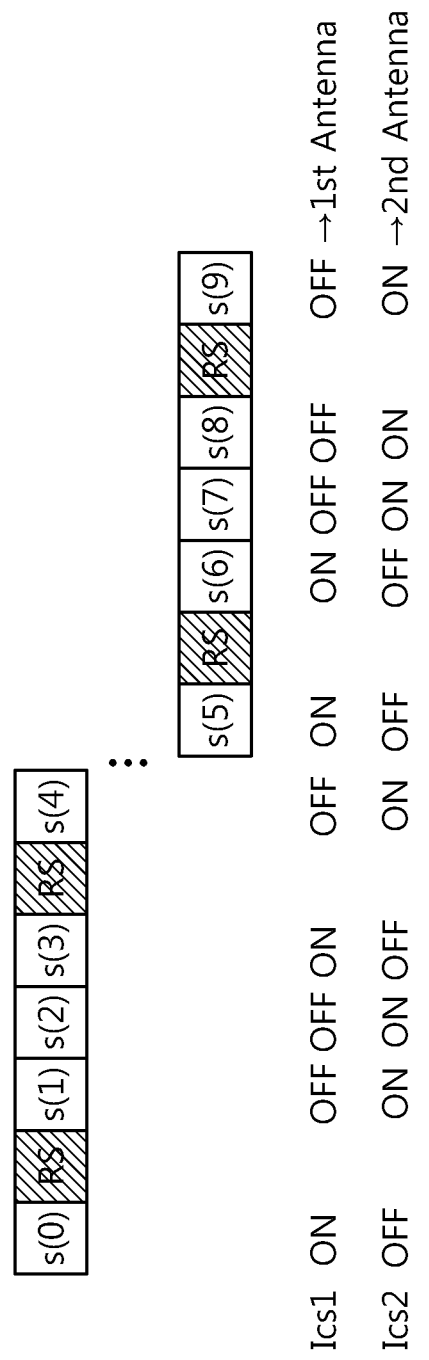
FIG. 17 shows an application to an SOR.

FIG. 17 shows an application to an SOR. Spread sequences s(0), s(3), s(5), and s(6) using the first cyclic shift index $I_{cs1}$ are transmitted through a first antenna, and spread sequences s(1), s(2), s(4), s(7), s(8), and s(9) using the second cyclic shift index $I_{cs2}$ are transmitted through a second antenna.

When the SCBC (1) of Table 8 or the SCBCs (1) and (7) of Table 9 are used, the spread sequences $s(0), \ldots, s(9)$ may be represented as follows for each antenna.

First antenna: {$s(0), s(1), \ldots, s(9)$}={$d(0)r(n,I_{cs1}), -d(1)^*r(n,I_{cs2}), -d(2)^*r(n,I_{cs2}), d(3)r(n,I_{cs1}), -d(4)^*r(n,I_{cs2}), d(5)r(n,I_{cs1}), d(6)r(n,I_{cs1}), -d(7)^*r(n,I_{cs2}), -d(8)^*r(n,I_{cs2}), -d(9)^*r(n,I_{cs2})$}

Second antenna: {$s(0), s(1), \ldots, s(9)$}={$d(0)^*r(n,I_{cs2}), d(1)r(n,I_{cs1}), d(2)r(n,I_{cs1}), d(3)^*r(n,I_{cs2}), d(4)r(n,I_{cs1}), d(5)^*r(n,I_{cs2}), d(6)^*r(n,I_{cs2}), d(7)r(n,I_{cs1}), d(8)r(n,I_{cs1}), d(9)r(n,I_{cs1})$}

When the SCBC (6) of Table 8 or the SCBCs (1) and (10) of Table 9 are used, the spread sequences $s(0), \ldots, s(9)$ may be represented as follows for each antenna.

First antenna: {$s(0), s(1), \ldots, s(9)$}={$d(0)r(n,I_{cs1}), d(1)r(n,I_{cs2}), d(2)r(n,I_{cs2}), d(3)r(n,I_{cs1}), d(4)r(n,I_{cs2}), d(5)r(n,I_{cs1}), d(6)r(n,I_{cs1}), d(7)r(n,I_{cs2}), d(8)r(n,I_{cs2}), d(9)r(n,I_{cs2})$}

Second antenna: {$s(0), s(1), \ldots, s(9)$}={$d(0)^*r(n,I_{cs2}), -d(1)^*r(n,I_{cs1}), -d(2)^*r(n,I_{cs1}), d(3)^*r(n,I_{cs2}), -d(4)^*r(n,I_{cs1}), d(5)^*r(n,I_{cs2}), d(6)^*r(n,I_{cs2}), -d(7)^*r(n,I_{cs1}), -d(8)^*r(n,I_{cs1}), -d(9)^*r(n,I_{cs1})$}

Second Embodiment

A scheme for applying resource selection using a new mapping rule to multiple antennas transmission is described below.

Figure 18:
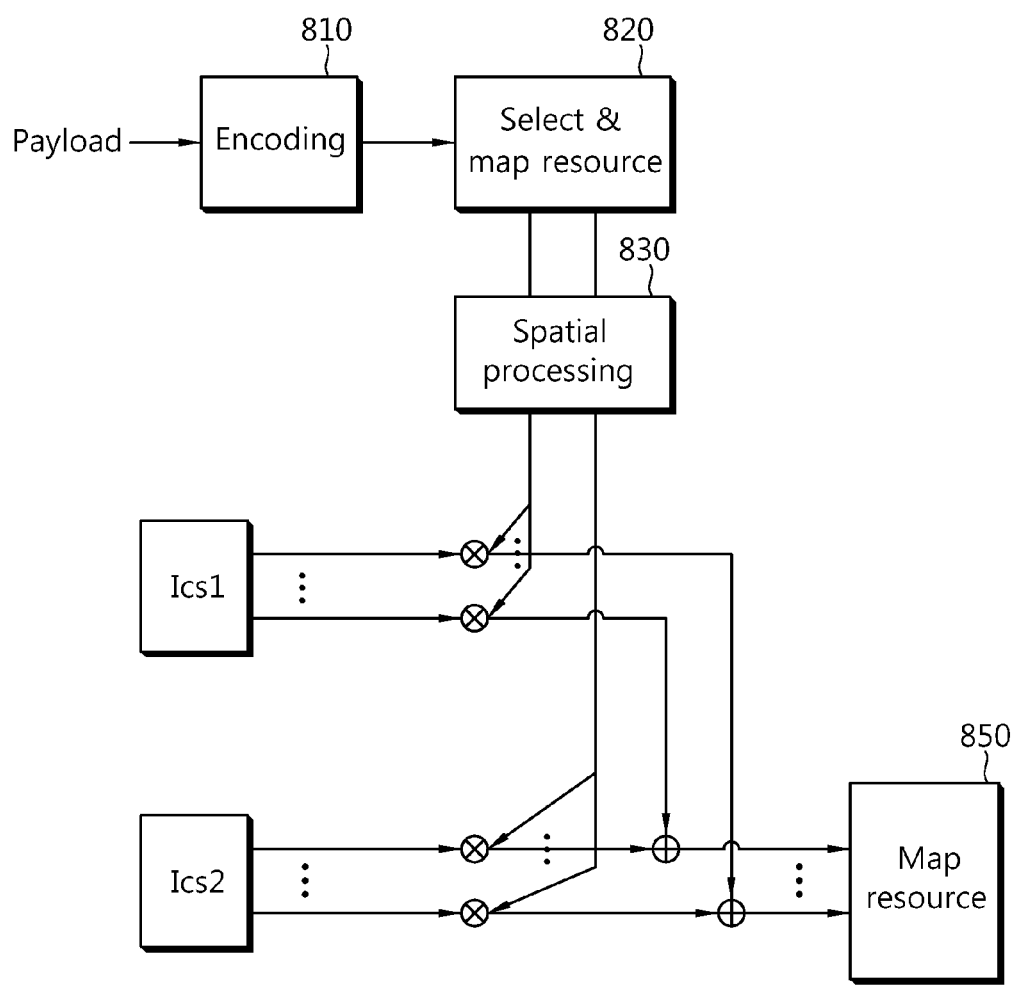
FIG. 18 is a block diagram showing an application of a mapping rule.

FIG. 18 is a block diagram showing an application of the mapping rule. A payload is encoded by an encoder, thus becoming encoded bits (810). There is no limit to the encoding method, and a well-known method, such as block coding, convolutional coding, TBCC (tail-biting convolutional coding), or turbo codes, may be used as the encoding method.

The encoded bits are converted into a modulation symbol using a mapping rule in which a resource selection scheme using a plurality of allocated cyclic shift indices and a modulation scheme are combined (820). Assuming that the encoded bits are m bits, a plurality of cyclic shift indices, corresponding to n (n≥1) bits of the m bits, and PSK (Phase Shift Keying) of a $2^{(m-n)}$ order or QAM of a $2^{(m-n)}$ order, corresponding to (m−n) bits, may be used.

It is assumed that the encoded bits mapped to one modulation symbol are $b_0, b_1, \ldots, b_M$. When two cyclic shift indices are allocated, a 1 bit can be represented using the resource selection scheme. Accordingly, the encoded bit $b_0$ indicates a selected cyclic shift index, and a modulation scheme (e.g., $2^M$-PSK) having an M modulation order is applied to the remaining bits $b_1, \ldots, b_M$. This will be described in more detail below.

The modulation symbol is subjected to spatial processing according to relevant cyclic shift indices (830). An SOR or an SCBC may be used as the spatial processing.

The spatially processed modulation symbol is spread into a sequence corresponding to a relevant cyclic shift index, thereby generating a spread sequence. The spread sequence is a sequence, having complex value symbols, as elements by multiplying the modulation symbol by the cyclic-shifted sequence. The spread sequence is mapped to a physical resource and then transmitted (850). For example, assuming 0≤n≤11, the spread sequence s(i) becomes d(i)r(n, $I_{cs}$)={d(i) r(0, $I_{cs}$), d(i)r(1, $I_{cs}$), . . . , d(i)r(11, $I_{cs}$)}, and each element d(i)r(n, $I_{cs}$) of the spread sequence is mapped to each subcarrier of a relevant resource block and then transmitted.

The following table shows an example of mapping between an encoded bit and a modulation symbol, when two cyclic shift indices $I_{cs1}$ and $I_{cs2}$ are allocated and QPSK mapping of Table 6 is used.

TABLE 11

| Encoded Bits | $I_{cs1}$ I | $I_{cs1}$ Q | $I_{cs2}$ I | $I_{cs2}$ Q |
|---|---|---|---|---|
| 000 | $1/\sqrt{2}$ | $1/\sqrt{2}$ | | |
| 001 | $1/\sqrt{2}$ | $-1/\sqrt{2}$ | | |
| 010 | $-1/\sqrt{2}$ | $1/\sqrt{2}$ | | |
| 011 | $-1/\sqrt{2}$ | $-1/\sqrt{2}$ | | |
| 100 | | | $1/\sqrt{2}$ | $1/\sqrt{2}$ |
| 101 | | | $1/\sqrt{2}$ | $-1/\sqrt{2}$ |
| 110 | | | $-1/\sqrt{2}$ | $1/\sqrt{2}$ |
| 111 | | | $-1/\sqrt{2}$ | $-1/\sqrt{2}$ |

Alternatively, the following table shows another example of mapping between an encoded bit and a modulation symbol.

TABLE 12

| Encoded Bits | $I_{cs1}$ I | $I_{cs1}$ Q | $I_{cs2}$ I | $I_{cs2}$ Q |
|---|---|---|---|---|
| 000 | $-1/\sqrt{2}$ | $-1/\sqrt{2}$ | | |
| 001 | | | $-1/\sqrt{2}$ | $-1/\sqrt{2}$ |
| 010 | $-1/\sqrt{2}$ | $1/\sqrt{2}$ | | |
| 011 | | | $-1/\sqrt{2}$ | $1/\sqrt{2}$ |
| 100 | | | $1/\sqrt{2}$ | $-1/\sqrt{2}$ |
| 101 | $1/\sqrt{2}$ | $-1/\sqrt{2}$ | | |
| 110 | | | $1/\sqrt{2}$ | $1/\sqrt{2}$ |
| 111 | $1/\sqrt{2}$ | $1/\sqrt{2}$ | | |

Figure 19:
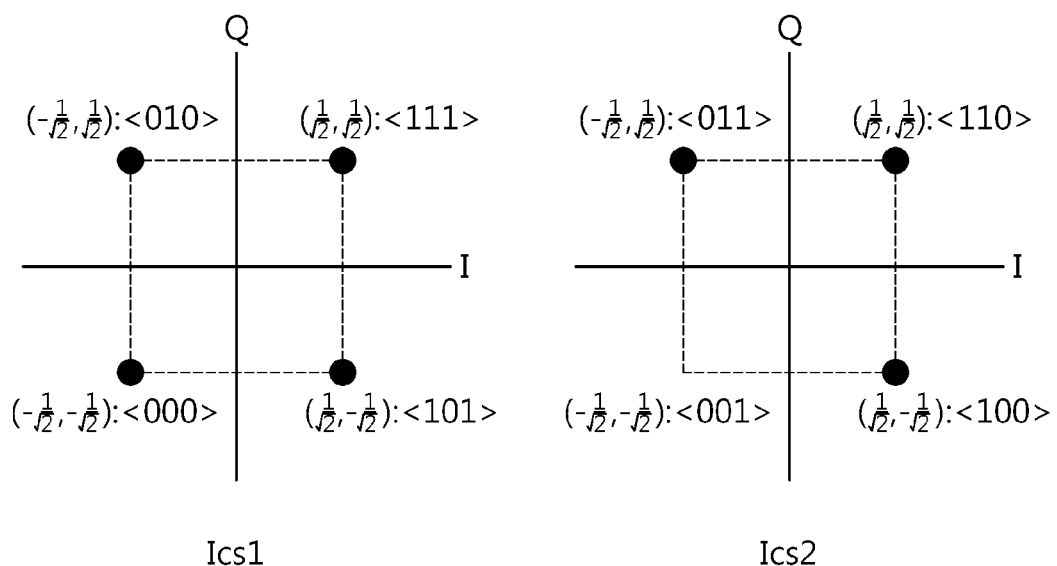
FIG. 19 shows a constellation according to mapping of Table 12.

Table 12 has been designed by taking a Eucledian distance into consideration. FIG. 19 shows a constellation according to the mapping of Table 12. The Eucledian distance is the greatest between symbols positioned on a diagonal line. With an increase in the Eucledian distance, there is less probability that error may occur between symbols. A bit having the greatest Hamming distance is positioned.

A detailed example is described below.

The following CQI information bits of 14 bits are taken into consideration.

<1,1,0,0,0,0,0,0,0,1,0,0,0,0>

The following encoded bits of 30 bits may be generated by applying a TBCC to the information bit.

<1,0,1, 0,1,1, 0,0,1, 0,0,0, 1,1,1, 0,1,1, 1,0,0, 1,0,1, 1,0,1, 1,1,1>

When the mapping according to Table 8 is performed, modulation symbols d(0), . . . , d(9), such as those listed in the following table, may be obtained according to cyclic shift indices.

TABLE 13

| | | d(0) | d(1) | d(2) | d(3) | d(4) | d(5) | d(6) | d(7) | d(8) | d(9) |
|---|---|---|---|---|---|---|---|---|---|---|---|
| $I_{cs1}$ | I | $1/\sqrt{2}$ | | | $-1/\sqrt{2}$ | $1/\sqrt{2}$ | | | $1/\sqrt{2}$ | $1/\sqrt{2}$ | $1/\sqrt{2}$ |
| | Q | $-1/\sqrt{2}$ | | | $-1/\sqrt{2}$ | $1/\sqrt{2}$ | | | $-1/\sqrt{2}$ | $-1/\sqrt{2}$ | $1/\sqrt{2}$ |
| $I_{cs2}$ | I | | $-1/\sqrt{2}$ | $-1/\sqrt{2}$ | | | $-1/\sqrt{2}$ | $1/\sqrt{2}$ | | | |
| | Q | | $1/\sqrt{2}$ | $-1/\sqrt{2}$ | | | $1/\sqrt{2}$ | $-1/\sqrt{2}$ | | | |

The spread sequences s(0), . . . , s(9) for the PUCCH format 2 in a single antenna may be represented using the modulation symbols.

{s(0), s(1), . . . , s(9)}={d(0)r(n,$I_{cs1}$), d(1)r(n,$I_{cs2}$), d(2)r(n, $I_{cs2}$), d(3)r(n,$I_{cs1}$), d(4)r(n,$I_{cs1}$), d(5)r(n,$I_{cs2}$), d(6)r(n,$I_{cs2}$), d(7)r(n,$I_{cs1}$), d(8)r(n,$I_{cs1}$), d(9)r(n,$I_{cs1}$)}

When the SCBC (6) of Table 8 is applied to the modulation symbols of Table 13, symbols, such as those shown in the following table, can be obtained.

TABLE 14

| | | d'(0) | d'(1) | d'(2) | d'(3) | d'(4) | d'(5) | d'(6) | d'(7) | d'(8) | d'(9) |
|---|---|---|---|---|---|---|---|---|---|---|---|
| 1st Antenna | | | | | | | | | | | |
| $I_{cs1}$ | I | $1/\sqrt{2}$ | | | $-1/\sqrt{2}$ | $1/\sqrt{2}$ | | | $1/\sqrt{2}$ | $1/\sqrt{2}$ | $1/\sqrt{2}$ |
| | Q | $-1/\sqrt{2}$ | | | $-1/\sqrt{2}$ | $1/\sqrt{2}$ | | | $-1/\sqrt{2}$ | $-1/\sqrt{2}$ | $1/\sqrt{2}$ |
| $I_{cs2}$ | I | | $-1/\sqrt{2}$ | $-1/\sqrt{2}$ | | | $-1/\sqrt{2}$ | $1/\sqrt{2}$ | | | |
| | Q | | $1/\sqrt{2}$ | $-1/\sqrt{2}$ | | | $1/\sqrt{2}$ | $-1/\sqrt{2}$ | | | |
| 2nd Antenna | | | | | | | | | | | |
| $I_{cs1}$ | I | | $1/\sqrt{2}$ | $1/\sqrt{2}$ | | | $1/\sqrt{2}$ | $-1/\sqrt{2}$ | | | |
| | Q | | $1/\sqrt{2}$ | $-1/\sqrt{2}$ | | | $1/\sqrt{2}$ | $-1/\sqrt{2}$ | | | |
| $I_{cs2}$ | I | $1/\sqrt{2}$ | | | $-1/\sqrt{2}$ | $1/\sqrt{2}$ | | | $1/\sqrt{2}$ | $1/\sqrt{2}$ | $1/\sqrt{2}$ |
| | Q | $1/\sqrt{2}$ | | | $1/\sqrt{2}$ | $-1/\sqrt{2}$ | | | $1/\sqrt{2}$ | $1/\sqrt{2}$ | $-1/\sqrt{2}$ |

From the symbols of Table 14, the spread sequences s(0), . . . , s(9) may be represented as follows for each antenna.

First antenna: {s(0), s(1), . . . , s(9)}={d(0)r(n,$I_{cs1}$), d(1)r(n,$I_{cs2}$), d(2)r(n,$I_{cs2}$), d(3)r(n,$I_{cs1}$), d(4)r(n,$I_{cs1}$), d(5)r(n,$I_{cs2}$), d(6)r(n,$I_{cs2}$), d(7)r(n,$I_{cs1}$), d(8)r(n,$I_{cs1}$), d(9)r(n,$I_{cs1}$)}

Second antenna: {s(0), s(1), . . . , s(9)}={d(0)\*r(n,$I_{cs2}$), −d(1)\*r(n,$I_{cs1}$), −d(2)\*r(n,$I_{cs1}$), d(3)\*r(n,$I_{cs2}$), d(4)\*r(n,$I_{cs2}$), −d(5)\*r(n,$I_{cs1}$), −d(6)\*r(n,$I_{cs1}$), d(7)\*r(n,$I_{cs2}$), d(8)\*r(n,$I_{cs2}$), d(9)\*r(n,$I_{cs2}$)}

Figure 20:
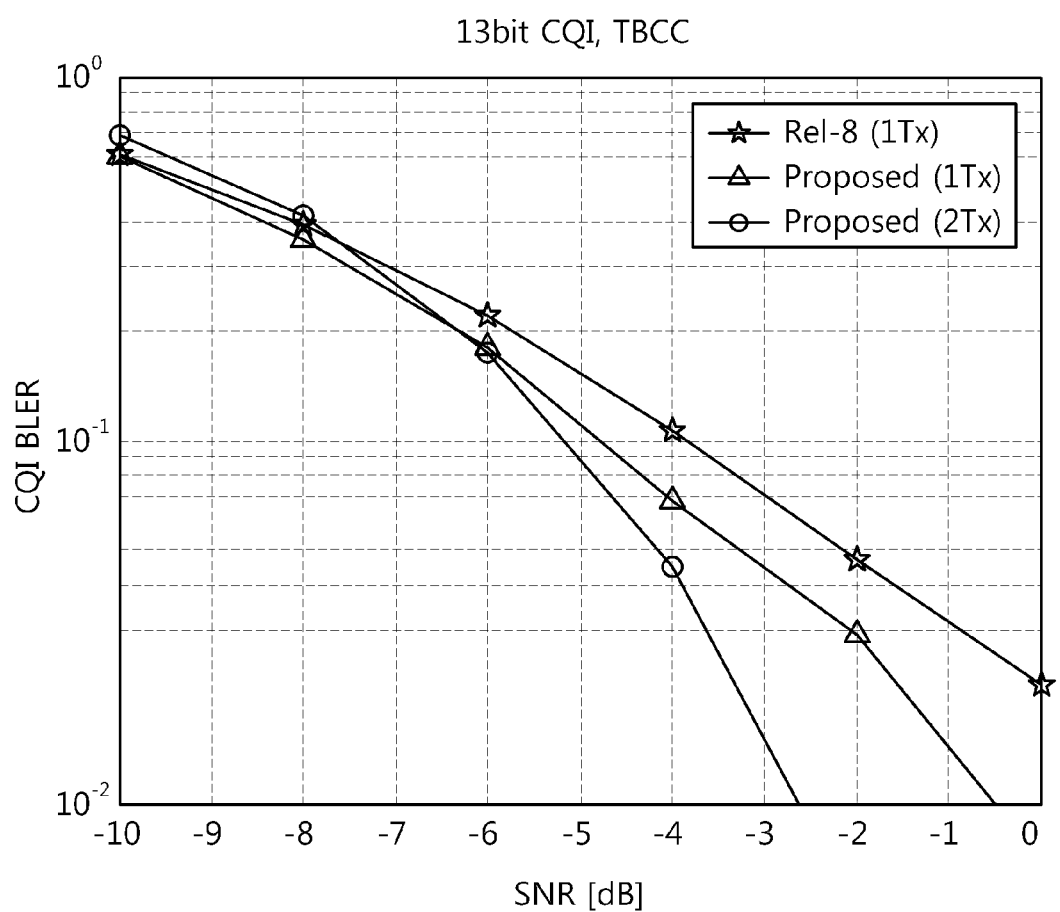
FIG. 20 is a graph showing CQI BLER (Block Error Rate) performance.

FIG. 20 is a graph showing CQI BLER (Block Error Rate) performance. The graph shows that a single antenna has an SNR (Signal-to-Noise Ratio) gain of about 1.5 dB and two antennas show an SNR gain of about 3.5 dB, as compared with a conventional PUCCH format 2 (indicated by 'Rel-8 (1Tx)').

In the mapping of Tables 11 and 12, the QPSK modulation scheme is performed for selected cyclic shift indices, but not limited to the modulation scheme. A variety of modulation scheme, such as M-QAM and M-PSK, may be used.

When two cyclic shift indices $I_{cs1}$ and $I_{cs2}$ are allocated and 8-PSK mapping is used, mapping between an encoded bit and a modulation symbol is described below. Here, encoded bits of 4 bits are mapped to one modulation symbol. The following table shows an example of the mapping.

TABLE 15

| Encoded Bits | $I_{cs1}$ I | $I_{cs1}$ Q | $I_{cs2}$ I | $I_{cs2}$ Q |
|---|---|---|---|---|
| 0000 | −1/√2 | −1/√2 | | |
| 0001 | −1 | 0 | | |
| 0010 | | | −1 | 0 |
| 0011 | | | −1/√2 | −1/√2 |
| 0100 | | | 0 | 1 |
| 0101 | −1/√2 | 1/√2 | 0 | 0 |
| 0110 | | | −1/√2 | 1/√2 |

TABLE 15-continued

| Encoded Bits | $I_{cs1}$ I | $I_{cs1}$ Q | $I_{cs2}$ I | $I_{cs2}$ Q |
|---|---|---|---|---|
| 0111 | 0 | 1 | | |
| 1000 | 0 | −1 | | |
| 1001 | | | 1/√2 | −1/√2 |
| 1010 | 1/√2 | −1/√2 | | |
| 1011 | | | 0 | −1 |
| 1100 | | | 1/√2 | 1/√2 |
| 1101 | | | 1 | 0 |
| 1110 | 1 | 0 | | |
| 1111 | 1/√2 | 1/√2 | | |

Figure 21:
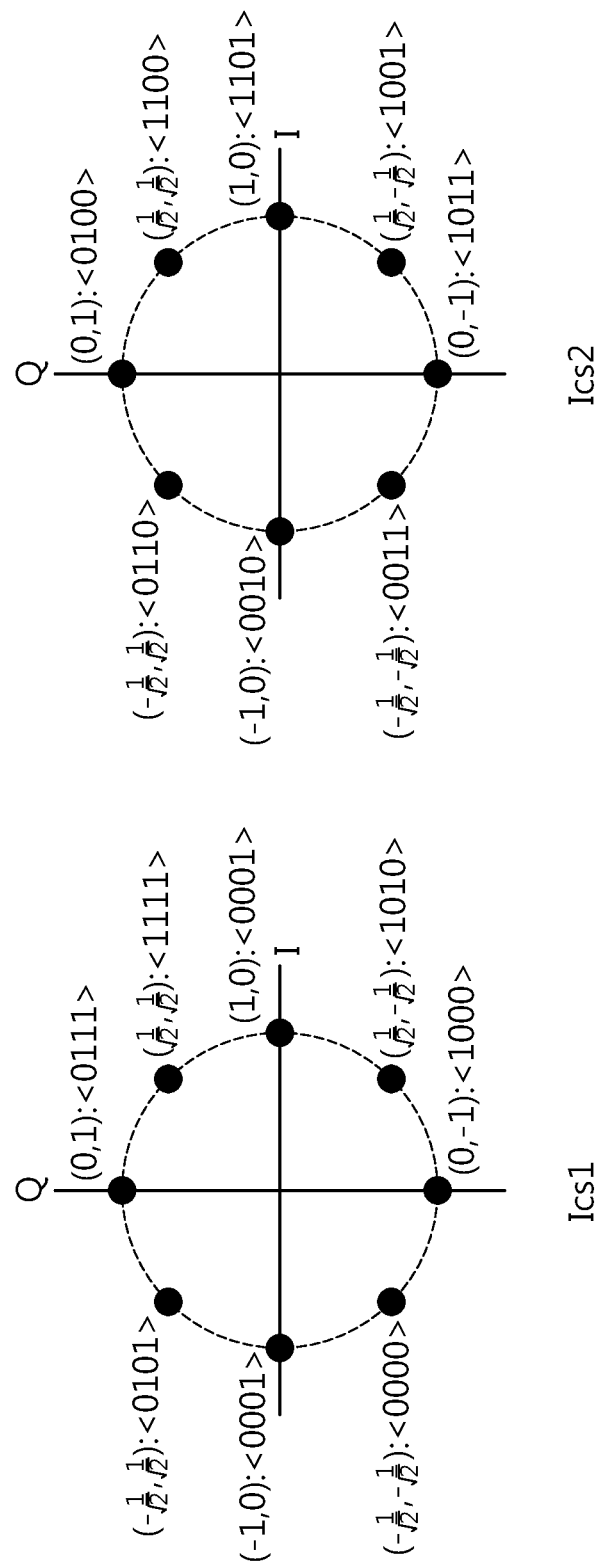
FIG. 21 shows a constellation according to the mapping of Table 15.

FIG. 21 shows a constellation according to the mapping of Table 15. Encoded bits corresponding to contiguous modulation symbols belonging to one cyclic shift index have different bit values in one bit position. For example, encoded bits '0111' and '0101', belonging to the cyclic shift index $I_{cs1}$ and corresponding to contiguous modulation symbols, have different bit values in one bit position (e.g., a third bit position). This is for securing an optimal Eucledian distance.

In order to describe a detailed example, the following CQI information bits of 14 bits are taken into consideration.

<1,0,1,1,1,0,0,1,0,1,1,1,1,1>

The following encoded bits of 40 bits may be generated by applying a TBCC to an information bit.

<1,0,1,0, 0,0,0,1, 1,1,0,0, 0,0,0,0, 1,0,1,0, 1,1,0,0, 0,0,0,0, 0,0,0,0, 1,1,1,1, 0,1,0,1>

When the mapping according to Table 15 is performed, modulation symbols d(0), . . . , d(9), such as those listed in the following table, may be obtained according to cyclic shift indices.

TABLE 16

| | | d(0) | d(1) | d(2) | d(3) | d(4) | d(5) | d(6) | d(7) | d(8) | d(9) |
|---|---|---|---|---|---|---|---|---|---|---|---|
| $I_{cs1}$ | I | 0 | −1 | | −1/√2 | 1/√2 | | −1/√2 | −1/√2 | 1/√2 | −1/√2 |
| | Q | −1 | 0 | | −1/√2 | −1/√2 | | −1/√2 | −1/√2 | 1/√2 | 1/√2 |
| $I_{cs2}$ | I | | | 1/√2 | | | 1/√2 | | | | |
| | Q | | | 1/√2 | | | 1/√2 | | | | |

Spread sequences s(0), . . . , s(9) for the PUCCH format 2 in a single antenna may be represented as follow using the modulation symbols.

{s(0), s(1), . . . , s(9)}={d(0)r(n,$I_{cs1}$), d(1)r(n,$I_{cs1}$), d(2)r(n,$I_{cs2}$), d(3)r(n,$I_{cs1}$), d(4)r(n,$I_{cs1}$), d(5)r(n,$I_{cs2}$), d(6)r(n,$I_{cs1}$), d(7)r(n,$I_{cs1}$), d(8)r(n,$I_{cs1}$), d(9)r(n,$I_{cs1}$)}

When the SCBC (6) of Table 8 is applied to the modulation symbols of Table 16, symbols, such as those listed in the following table, may be obtained.

TABLE 17

| | | d'(0) | d'(1) | d'(2) | d'(3) | d'(4) | d'(5) | d'(6) | d'(7) | d'(8) | d'(9) |
|---|---|---|---|---|---|---|---|---|---|---|---|
| 1st Antenna | | | | | | | | | | | |
| $I_{cs1}$ | I | 0 | −1 | | −1/√2 | 1/√2 | | −1/√2 | −1/√2 | 1/√2 | −1/√2 |
| | Q | −1 | 0 | | −1/√2 | −1/√2 | | −1/√2 | −1/√2 | 1/√2 | 1/√2 |
| $I_{cs2}$ | I | | | 1/√2 | | | 1/√2 | | | | |
| | Q | | | 1/√2 | | | 1/√2 | | | | |
| 2nd Antenna | | | | | | | | | | | |

TABLE 17-continued

|  |  | d'(0) | d'(1) | d'(2) | d'(3) | d'(4) | d'(5) | d'(6) | d'(7) | d'(8) | d'(9) |
|---|---|---|---|---|---|---|---|---|---|---|---|
| $I_{cs1}$ | I |  |  | $-1/\sqrt{2}$ |  |  | $-1/\sqrt{2}$ |  |  |  |  |
|  | Q |  |  | $1/\sqrt{2}$ |  |  | $1/\sqrt{2}$ |  |  |  |  |
| $I_{cs2}$ | I | 0 | $-1$ |  | $-1/\sqrt{2}$ | $1/\sqrt{2}$ |  | $-1/\sqrt{2}$ | $-1/\sqrt{2}$ | $1/\sqrt{2}$ | $-1/\sqrt{2}$ |
|  | Q | 1 | 0 |  | $1/\sqrt{2}$ | $1/\sqrt{2}$ |  | $1/\sqrt{2}$ | $1/\sqrt{2}$ | $-1/\sqrt{2}$ | $-1/\sqrt{2}$ |

From the symbols of Table 17, the spread sequences $s(0), \ldots, s(9)$ may be represented as follows for each antenna.

First antenna: $\{s(0), s(1), \ldots, s(9)\} = \{d(0)r(n,I_{cs1}), d(1)r(n,I_{cs1}), d(2)r(n,I_{cs2}), d(3)r(n,I_{cs1}), d(4)r(n,I_{cs1}), d(5)r(n,I_{cs2}), d(6)r(n,I_{cs1}), d(7)r(n,I_{cs1}), d(8)r(n,I_{cs1}), d(9)r(n,I_{cs1})\}$ Second antenna: $\{s(0), s(1), \ldots, s(9)\} = \{d(0)*r(n,I_{cs2}), d(1)*r(n,I_{cs2}), -d(2)*r(n,I_{cs1}), d(3)*r(n,I_{cs2}), d(4)*r(n,I_{cs2}), -d(5)*r(n,I_{cs1}), d(6)*r(n,I_{cs2}), d(7)*r(n,I_{cs2}), d(8)*r(n,I_{cs2}), d(9)*r(n,I_{cs2})\}$ Third Embodiment When both resource selection and precoding are used, the capacity of a payload can be further increased and a relatively low CM can also be obtained.

Figure 22:
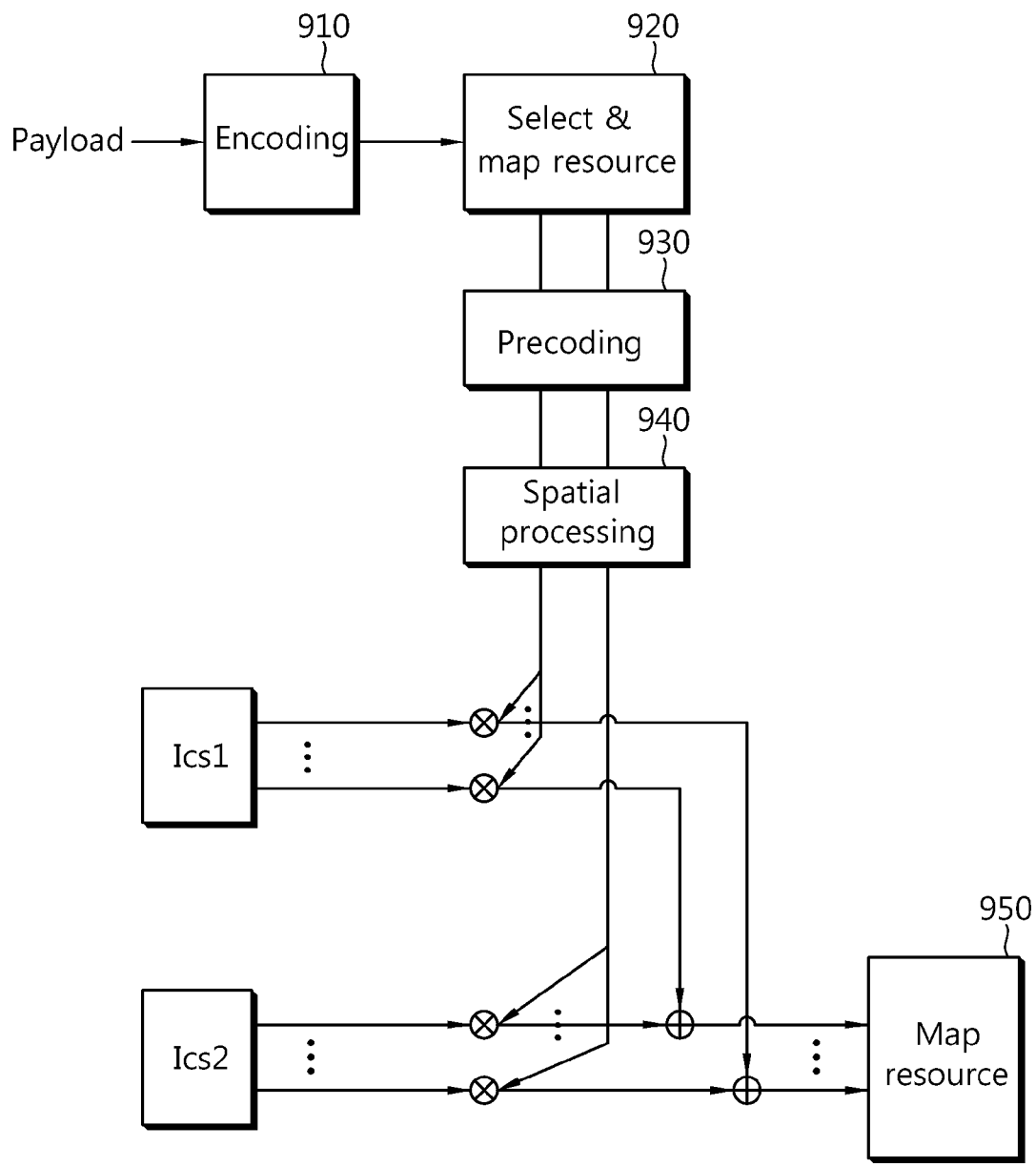
FIG. 22 is a block diagram showing a resource selection scheme using precoding.

FIG. 22 is a block diagram showing a resource selection scheme using precoding. A payload is encoded by an encoder, thus becoming encoded bits (910). The encoded bits are mapped according to a predetermined modulation scheme and then converted into a modulation symbol (920). The modulation symbol is precoded into a precoding matrix (or a precoding vector) corresponding to a cyclic shift index (930). Each row of the precoding matrix corresponds to the cyclic shift index. The precoded modulation symbol is subjected to spatial processing according to a relevant cyclic shift index (940). An SOR or an SCBC may be used as the spatial processing.

The spatially processed symbol is spread into a sequence corresponding to a relevant cyclic shift index. The spread sequence is mapped to a physical resource and then transmitted (950).

Figure 23:
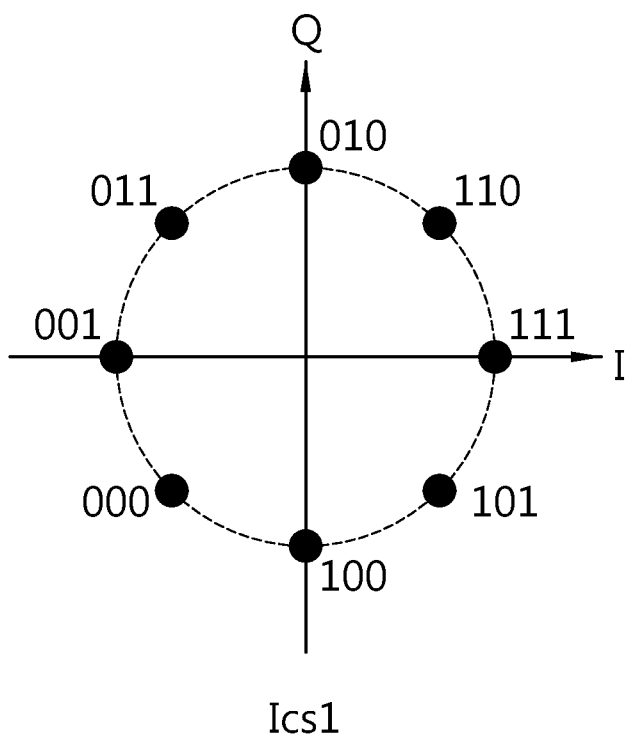
FIG. 23 shows a common 8-PSK constellation.

For a detailed example, an 8-PSK constellation of FIG. 23 is taken into consideration. The 8-PSK constellation is based on common gray mapping and may be represented by the following table.

TABLE 18

| Encoded Bits | I | Q |
|---|---|---|
| 000 | $-1/\sqrt{2}$ | $-1/\sqrt{2}$ |
| 001 | $-1$ | 0 |
| 010 | 0 | 1 |
| 011 | $-1/\sqrt{2}$ | $1/\sqrt{2}$ |
| 100 | 0 | $-1$ |
| 101 | $1/\sqrt{2}$ | $-1/\sqrt{2}$ |
| 110 | $1/\sqrt{2}$ | $1/\sqrt{2}$ |
| 111 | 1 | 0 |

It is assumed that a precoding vector of [+1 +1] is used in the first cyclic shift index $I_{cs1}$ and a precoding vector of [+1 −1] is used in the second cyclic shift index $I_{cs2}$. This may be represented by the following equation.

$$\begin{pmatrix} I_{cs1} \\ I_{cs2} \end{pmatrix} = \begin{pmatrix} 1 & 1 \\ 1 & -1 \end{pmatrix} \begin{pmatrix} d(i) \\ d(i+1) \end{pmatrix} \quad \text{[Equation 4]}$$

For example, when the precoding vector of [+1 +1] is applied to a modulation symbol (−1,0) corresponding to bits (001) and to a modulation symbol (0,1) corresponding to bits (010) in Table 18, a symbol (−1, 1) is obtained and used in the first cyclic shift index $I_{cs1}$. Furthermore, when the precoding vector of [+1 −1] is applied to a symbol (−1,0) corresponding to bits (001) and a symbol (0,1) corresponding to bits (010), a symbol (−1, −1) is obtained and used in the second cyclic shift index $I_{cs2}$.

When precoding and two cyclic shift indices are used, the existing encoded bits of 3 bits are extended and used, as if encoded bits of 6 bits are mapped to one modulation symbol. The following table shows an example of mapping between the encoded bit and the modulation symbol, when two cyclic shift indices $I_{cs1}$ and $I_{cs2}$ are allocated and the precoding and the 8-PSK mapping of Table 12 are used.

TABLE 19

| Encoded Bits | $I_{cs1}$ | | $I_{cs2}$ | |
|---|---|---|---|---|
|  | I | Q | I | Q |
| 000000 | $-1/\sqrt{2} - 1/\sqrt{2}$ | $-1/\sqrt{2} - 1/\sqrt{2}$ | 0 | 0 |
| 000001 | $-1/\sqrt{2} - 1$ | $-1/\sqrt{2}$ | $-1/\sqrt{2} + 1$ | $-1/\sqrt{2}$ |
| 000010 | $-1/\sqrt{2}$ | $-1/\sqrt{2} + 1$ | $-1/\sqrt{2}$ | $-1/\sqrt{2} - 1$ |
| 000011 | $-1/\sqrt{2} - 1/\sqrt{2}$ | 0 | 0 | $-1/\sqrt{2} - 1/\sqrt{2}$ |
| 000100 | $-1/\sqrt{2}$ | $-1/\sqrt{2} - 1$ | $-1/\sqrt{2}$ | $-1/\sqrt{2} + 1$ |
| 000101 | 0 | $-1/\sqrt{2} - 1/\sqrt{2}$ | $-1/\sqrt{2} - 1/\sqrt{2}$ | 0 |
| 000110 | 0 | 0 | $-1/\sqrt{2} - 1/\sqrt{2}$ | $-1/\sqrt{2} - 1/\sqrt{2}$ |
| 000111 | $-1/\sqrt{2} + 1$ | $-1/\sqrt{2}$ | $-1/\sqrt{2} - 1$ | $-1/\sqrt{2}$ |
| 001000 | $-1 - 1/\sqrt{2}$ | $-1/\sqrt{2}$ | $-1 + 1/\sqrt{2}$ | $-1/\sqrt{2}$ |
| 001001 | $-1 - 1$ | 0 | 0 | 0 |
| 001010 | $-1$ | 1 | $-1$ | $-1$ |
| 001011 | $-1 - 1/\sqrt{2}$ | $1/\sqrt{2}$ | $-1 + 1/\sqrt{2}$ | $-1/\sqrt{2}$ |
| 001100 | $-1$ | $-1$ | $-1$ | 1 |
| 001101 | $-1 + 1/\sqrt{2}$ | $-1/\sqrt{2}$ | $-1 - 1/\sqrt{2}$ | $1/\sqrt{2}$ |
| 001110 | $-1 + 1/\sqrt{2}$ | $1/\sqrt{2}$ | $-1 - 1/\sqrt{2}$ | $-1/\sqrt{2}$ |
| 001111 | 0 | 0 | $-1 - 1$ | 0 |
| 010000 | $-1/\sqrt{2}$ | $1 - 1/\sqrt{2}$ | $1/\sqrt{2}$ | $1 + 1/\sqrt{2}$ |
| 010010 | $-1$ | 1 | 1 | 1 |
| 010010 | 0 | $1 + 1$ | 0 | 0 |
| 010011 | $-1/\sqrt{2}$ | $1 + 1/\sqrt{2}$ | $1/\sqrt{2}$ | $1 - 1/\sqrt{2}$ |
| 010100 | 0 | 0 | 0 | $1 + 1$ |
| 010101 | $1/\sqrt{2}$ | $1 - 1/\sqrt{2}$ | $-1/\sqrt{2}$ | $1 + 1/\sqrt{2}$ |
| 010110 | $1/\sqrt{2}$ | $1 + 1/\sqrt{2}$ | $-1/\sqrt{2}$ | $1 - 1/\sqrt{2}$ |
| 010111 | 1 | 1 | $-1$ | 1 |
| 011000 | $-1/\sqrt{2} - 1/\sqrt{2}$ | 0 | 0 | $1/\sqrt{2} + 1/\sqrt{2}$ |
| 011001 | $-1 - 1/\sqrt{2}$ | $1/\sqrt{2}$ | $1 - 1/\sqrt{2}$ | $1/\sqrt{2}$ |
| 011010 | $-1/\sqrt{2}$ | $1 + 1/\sqrt{2}$ | $-1/\sqrt{2}$ | $-1 + 1/\sqrt{2}$ |
| 011011 | $-1/\sqrt{2} - 1/\sqrt{2}$ | $1/\sqrt{2} + 1/\sqrt{2}$ | 0 | 0 |
| 011100 | $-1/\sqrt{2}$ | $-1 + 1/\sqrt{2}$ | $-1/\sqrt{2}$ | $1 + 1/\sqrt{2}$ |
| 011101 | 0 | 0 | $-1/\sqrt{2} - 1/\sqrt{2}$ | $1/\sqrt{2} + 1/\sqrt{2}$ |
| 011110 | 0 | $1/\sqrt{2} + 1/\sqrt{2}$ | $-1/\sqrt{2} - 1/\sqrt{2}$ | 0 |
| 011111 | $1 - 1/\sqrt{2}$ | $1/\sqrt{2}$ | $-1 - 1/\sqrt{2}$ | $1/\sqrt{2}$ |
| 100000 | $-1/\sqrt{2}$ | $-1 - 1/\sqrt{2}$ | $1/\sqrt{2}$ | $-1 + 1/\sqrt{2}$ |
| 100001 | $-1$ | $-1$ | 1 | $-1$ |

TABLE 19-continued

| Encoded Bits | $I_{cs1}$ I | $I_{cs1}$ Q | $I_{cs2}$ I | $I_{cs2}$ Q |
|---|---|---|---|---|
| 100010 | 0 | 0 | 0 | −1 − 1 |
| 100011 | −1/√2 | −1 + 1/√2 | 1/√2 | −1 − 1/√2 |
| 100100 | 0 | −1 − 1 | 0 | 0 |
| 100101 | 1/√2 | −1 − 1/√2 | −1/√2 | −1 + 1/√2 |
| 100110 | 1/√2 | −1 + 1/√2 | −1/√2 | −1 − 1/√2 |
| 100111 | 1 | −1 | −1 | −1 |
| 101000 | 0 | −1/√2 − 1/√2 | 1/√2 + 1/√2 | 0 |
| 101001 | −1 + 1/√2 | −1/√2 | 1 + 1/√2 | −1/√2 |
| 101010 | 1/√2 | 1 − 1/√2 | 1/√2 | −1 − 1/√2 |
| 101011 | 0 | 0 | 1/√2 + 1/√2 | −1/√2 − 1/√2 |
| 101100 | 1/√2 | −1 − 1/√2 | 1/√2 | 1 − 1/√2 |
| 101101 | 1/√2 + 1/√2 | −1/√2 − 1/√2 | 0 | 0 |
| 101110 | 1/√2 + 1/√2 | 0 | 0 | −1/√2 − 1/√2 |
| 101111 | 1 + 1/√2 | −1/√2 | −1 + 1/√2 | −1/√2 |
| 110000 | 0 | 0 | 1/√2 + 1/√2 | 1/√2 + 1/√2 |
| 110001 | −1 + 1/√2 | 1/√2 | 1 + 1/√2 | 1/√2 |
| 110010 | 1/√2 | 1 + 1/√2 | 1/√2 | −1 + 1/√2 |
| 110011 | 0 | 1/√2 + 1/√2 | 1/√2 + 1/√2 | 0 |
| 110100 | 1/√2 | −1 + 1/√2 | 1/√2 | 1 + 1/√2 |
| 110101 | 1/√2 + 1/√2 | 0 | 0 | −1/√2 − 1/√2 |
| 110110 | 1/√2 + 1/√2 | 1/√2 + 1/√2 | 0 | 0 |
| 110111 | 1 + 1/√2 | 1/√2 | −1 + 1/√2 | 1/√2 |
| 111000 | 1 − 1/√2 | −1/√2 | 1 + 1/√2 | 1/√2 |
| 111001 | 0 | 0 | 1 + 1 | 0 |
| 111010 | 1 | 1 | 1 | −1 |
| 111011 | 1 − 1/√2 | 1/√2 | 1 + 1/√2 | −1/√2 |
| 111100 | 1 | −1 | 1 | 1 |
| 111101 | 1 + 1/√2 | −1/√2 | 1 − 1/√2 | 1/√2 |
| 111110 | 1 + 1/√2 | 1/√2 | 1 − 1/√2 | −1/√2 |
| 111111 | 1 + 1 | 0 | 0 | 0 |

In the above table, the number of encoded bits mapped to one modulation symbol (here, the modulation symbol indicates a set of two symbols respectively modulated to the two cyclic shift index) is 6. Only several modulation symbols having a low PAPR/CM, from among the modulation symbols, (i.e., the modulation symbols are selected such that a signal exists only in one cyclic shift and 0 is transmitted in the remaining cyclic shift) may be used.

When encoded bits corresponding to the selected modulation symbols are 4 bits and normalization is performed, a new mapping rule, such as that listed in the following table, can be defined.

TABLE 20

| Encoded Bits | $I_{cs1}$ I | $I_{cs1}$ Q | $I_{cs2}$ I | $I_{cs2}$ Q |
|---|---|---|---|---|
| 0000 | −1/√2 | −1/√2 | | |
| 0001 | | | 0 | −1 |
| 0010 | 0 | −1 | | |
| 0011 | | | −1/√2 | −1/√2 |
| 0100 | −1 | 0 | | |
| 0101 | | | 1/√2 | −1/√2 |
| 0110 | 1/√2 | −1/√2 | | |
| 0111 | | | −1 | 0 |
| 1000 | | | 1/√2 | 1/√2 |
| 1001 | 0 | 1 | | |
| 1010 | | | 0 | 1 |
| 1011 | 1/√2 | 1/√2 | | |
| 1100 | | | 1 | 0 |
| 1101 | −1/√2 | 1/√2 | | |
| 1110 | | | −1/√2 | 1/√2 |
| 1111 | 1 | 0 | | |

In order to describe a detailed example, the following CQI information bits of 14 bits are taken into consideration.

<1,0,1,1,1,0,0,1,0,1,1,1,1,1>

The following encoded bits of 40 bits may be generated by applying a TBCC to the information bits.

<1,0,0,0, 0,0,0,1, 1,1,0,0, 0,0,0,0, 1,0,1,0, 1,1,0,0, 0,0,0,0, 0,0,0,0, 1,1,1,1, 0,1,0,1>

When the mapping according to Table 20 is performed, modulation symbols $d(0), \ldots, d(9)$, such as those listed in the following table, may be obtained according to cyclic shift indices.

TABLE 21

| | | d(0) | d(1) | d(2) | d(3) | d(4) | d(5) | d(6) | d(7) | d(8) | d(9) |
|---|---|---|---|---|---|---|---|---|---|---|---|
| $I_{cs1}$ | I | | | | −1/√2 | | | −1/√2 | −1/√2 | 1 | |
| | Q | | | | −1/√2 | | | −1/√2 | −1/√2 | 0 | |
| $I_{cs2}$ | I | 1/√2 | 0 | 1 | | 0 | 1 | | | | 1/√2 |
| | Q | 1/√2 | −1 | 0 | | 1 | 0 | | | | −1/√2 |

Spread sequences $s(0), \ldots, s(9)$ for the PUCCH format 2 may be represented as follows using the modulation symbols.
$\{s(0), s(1), \ldots, s(9)\} = \{d(0)r(n,I_{cs2}), d(1)r(n,I_{cs2}), d(2)r(n,I_{cs2}), d(3)r(n,I_{cs1}), d(4)r(n,I_{cs2}), d(5)r(n,I_{cs2}), d(6)r(n,I_{cs1}), d(7)r(n,I_{cs1}), d(8)r(n,I_{cs1}), d(9)r(n,I_{cs2})\}$ When the SCBC (6) of Table 8 is applied to the modulation symbols of Table 21, symbols, such as those listed in the following table, may be obtained.

TABLE 22

| | | d'(0) | d'(1) | d'(2) | d'(3) | d'(4) | d'(5) | d'(6) | d'(7) | d'(8) | d'(9) |
|---|---|---|---|---|---|---|---|---|---|---|---|
| | | | | | 1st Antenna | | | | | | |
| $I_{cs1}$ | I | | | | −1/√2 | | | −1/√2 | −1/√2 | 1 | |
| | Q | | | | −1/√2 | | | −1/√2 | −1/√2 | 0 | |

TABLE 22-continued

| | | d'(0) | d'(1) | d'(2) | d'(3) | d'(4) | d'(5) | d'(6) | d'(7) | d'(8) | d'(9) |
|---|---|---|---|---|---|---|---|---|---|---|---|
| $I_{cs2}$ | I | $1/\sqrt{2}$ | 0 | 1 | | 0 | 1 | | | | $1/\sqrt{2}$ |
| | Q | $1/\sqrt{2}$ | −1 | 0 | | 1 | 0 | | | | $−1/\sqrt{2}$ |
| | | | | | 2nd Antenna | | | | | | |
| $I_{cs1}$ | I | $−1/\sqrt{2}$ | 0 | −1 | | 0 | −1 | | | | $−1/\sqrt{2}$ |
| | Q | $1/\sqrt{2}$ | −1 | 0 | | 1 | 0 | | | | $−1/\sqrt{2}$ |
| $I_{cs2}$ | I | | | | $−1/\sqrt{2}$ | | | $−1/\sqrt{2}$ | $−1/\sqrt{2}$ | 1 | |
| | Q | | | | $1/\sqrt{2}$ | | | $1/\sqrt{2}$ | $1/\sqrt{2}$ | 0 | |

From the symbols of Table 22, the spread sequences s(0), ..., s(9) may be represented as follows for each antenna.

First antenna: {s(0), s(1), ..., s(9)}={d(0)r(n,$I_{cs2}$), d(1)r(n,$I_{cs2}$), d(2)r(n,$I_{cs2}$), d(3)r(n,$I_{cs1}$), d(4)r(n,$I_{cs2}$), d(5)r(n,$I_{cs2}$), d(6)r(n,$I_{cs1}$), d(7)r(n,$I_{cs1}$), d(8)r(n,$I_{cs1}$), d(9)r(n,$I_{cs2}$)}

Second antenna: {s(0), s(1), ..., s(9)}={−d(0)*r(n,$I_{cs1}$), −d(1)*r(n,$I_{cs1}$), −d(2)*r(n,$I_{cs1}$), d(3)*r(n,$I_{cs2}$), −d(4)*r(n,$I_{cs1}$), −d(5)*r(n,$I_{cs1}$), d(6)r(n,$I_{cs2}$), d(7)*r(n,$I_{cs2}$), d(8)*r(n,$I_{cs2}$), −d(9)*r(n,$I_{cs1}$)}

In the proposed various mapping rules, a modulation symbol indicating a position on a constellation is not absolute, but the position may be rotated on the constellation. For example, in the mapping table of Table 10, the row of a modulation symbol corresponding to each encoded bit may be shifted up or down at one or more intervals.

Although the applications to the PUCCH formats 2/2a/2b have been described so far, the proposed methods may also be applied to the PUCCH formats 1/1a/1b without change. In order to configure the PUCCH format 1, a UE has to know an orthogonal sequence index, a cyclic shift index, and a resource block index. An ACK/NACK resource may become one of the orthogonal sequence index, the cyclic shift index, the resource block index, and a combination of them.

In 3GPP LTE, the modulation symbols d(0) is generated by performing BPSK (Binary Phase Shift Keying) modulation for an 1-bit ACK/NACK signal or QPSK (Quadrature Phase Shift Keying) modulation for a 2-bit ACK/NACK signal. The following table shows constellation mapping of the 1-bit or 2-bit ACK/NACK signal in 3GPP LTE.

TABLE 23

| PUCCH Format | ACK/NACK | d(0) |
|---|---|---|
| 1a | 0 | 1 |
| | 1 | −1 |
| 1b | 00 | 1 |
| | 01 | −j |
| | 10 | j |
| | 11 | −1 |

Assuming that first and second ACK/NACK resources are allocated, a 3-bit ACK/NACK signal may be mapped to one modulation symbol through resource selection. When the QPSK modulation of Table 23 is used, the following table shows constellation mapping using resource selection.

TABLE 24

| ACK/NACK Bits | 1st ACK/NACK resource | 2nd ACK/NACK resource |
|---|---|---|
| 000 | 1 | |
| 001 | −j | |
| 010 | j | |
| 011 | −1 | |
| 100 | | 1 |
| 101 | | −j |
| 110 | | j |
| 111 | | −1 |

2 bits of the 3 bits indicate QPSK modulation, and the remaining 1 bit indicates a selected ACK/NACK resource. The modulation symbol d(0) may be subjected to the SCBC of Table 8 or Table 9 and then transmitted through multiple antennas.

According to 3GPP TS 36.211 V8.5.0 (2008-12), an ACK/NACK resource for the PUCCH formats 1/1a/1b is obtained from a resource of a corresponding PDCCH. The ACK/NACK resource (e.g., a first ACK/NACK resource) is determined on the basis of the number of first CCEs of a PDDCH or an index of the PDDCH. A BS may inform a UE of an additional second ACK/NACK resource for resource selection through RRC signaling. Alternatively, the second ACK/NACK resource may be determined on the basis of the number of other CCEs (e.g., a second CCE or the last CCE) other than the first CCE of a corresponding PDCCH or an index. Alternatively, the second ACK/NACK resource may be determined on the basis of the first ACK/NACK resource. For example, the second ACK/NACK resource may have a certain offset from the first ACK/NACK resource. The offset may be previously stored, or a BS may inform a UE of the offset.

Figure 24:
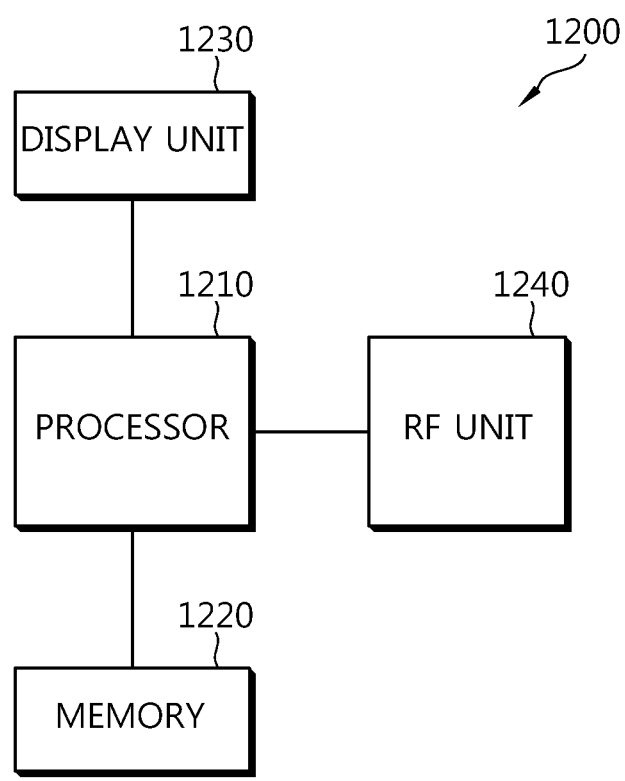
FIG. 24 is a block diagram showing a UE in which embodiments of the present invention are implemented.

FIG. 24 is a block diagram showing a UE in which the embodiments of the present invention are implemented. The UE 1200 includes a processor 1210, memory 1220, a display unit 1230, and a Radio Frequency (RF) unit 1240. The RF unit 1240 is connected to the processor 1210 and configured to transmit and/or receive a radio signal. The memory 1220 is connected to the processor 1210 and configured to store information for operations. The display unit 1230 displays several pieces of information of the UE 1200 and may use well-known elements, such as a Liquid Crystal Display (LCD) and Organic Light Emitting Diodes (OLED). The processor 1210 implements mapping and spatial processing using the proposed resource selection scheme. The processor 1210 may implement the SCBC of Table 8 or Table 9. The processor 1210 may implement a physical layer in accordance with the 3GPP LTE/LTE-A standard and also implement the proposed PUCCH formats using a plurality of allocated resources.

The processor 1210 may include Application-Specific Integrated Circuits (ASICs), other chipsets, logic circuits, and/or data processors. The memory 1220 may include Read-Only Memory (ROM), Random Access Memory (RAM), flash memory, a memory card, a storage medium and/or other storage devices. The RF unit 1240 may include a baseband circuit for processing a radio signal. When the above embodiments are implemented in software, the above schemes may be implemented using a module (or process or function) for performing the above functions. The module may be stored in the memory 1220 and may be executed by the processor 1210. The memory 1220 may be internal or external to the processor 1210 and may be coupled to the processor 1210 using a variety of well-known means.

A transmission scheme in which the embodiments of the present invention may be implemented is described below.

A subblock is a resource unit for mapping time domain symbols or frequency domain symbols or both to radio resources, and it may include, for example, 12 subcarriers. The subblocks may be contiguous to each other or may not be contiguous to each other. The amount (or size) of resources included in each subblock may be the same or different. For example, a subblock #1 may include 12 subcarriers, and a subblock #2 may include 24 subcarriers. The subblock may be called another terminology, such as a cluster, a resource block, or a subchannel. One or more subblocks may correspond to one carrier. The carrier is defined by a center frequency and a bandwidth.

Figure 25:
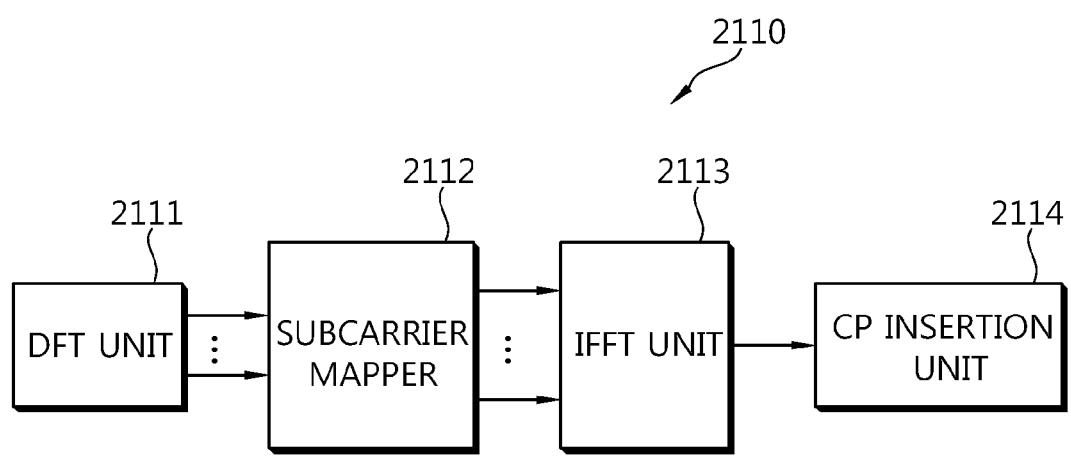
FIG. 25 is a block diagram showing a signal processing apparatus for performing SC-FDMA.

FIG. 25 is a block diagram showing a signal processing apparatus for performing SC-FDMA. A transmission scheme on which IFFT (Inverse Fast Fourier Transform) is performed after DFT spreading is called SC-FDMA. SC-FDMA is also called DFT-s (DFT-spread) OFDM. The signal processing apparatus 2110 includes a DFT (Discrete Fourier Transform) unit 2111, a subcarrier mapper 2112, an IFFT unit 2113, and a CP insertion unit 2114. The DFT unit 2111 performs DFT for received complex-valued symbols and outputs DFT symbols. The subcarrier mapper 2112 maps the DFT symbols to the respective subcarriers of the frequency domain. The IFFT unit 2113 performs IFFT for the mapped symbols in the frequency domain and outputs a time domain signal. The CP insertion unit 2114 inserts a CP into the time domain signal. The time domain signal into which the CP has been inserted becomes an OFDM symbol. If a used sequence is already a DFT-spread frequency domain sequence, DFT may not be additionally performed, but IFFT may be performed.

Figure 26:
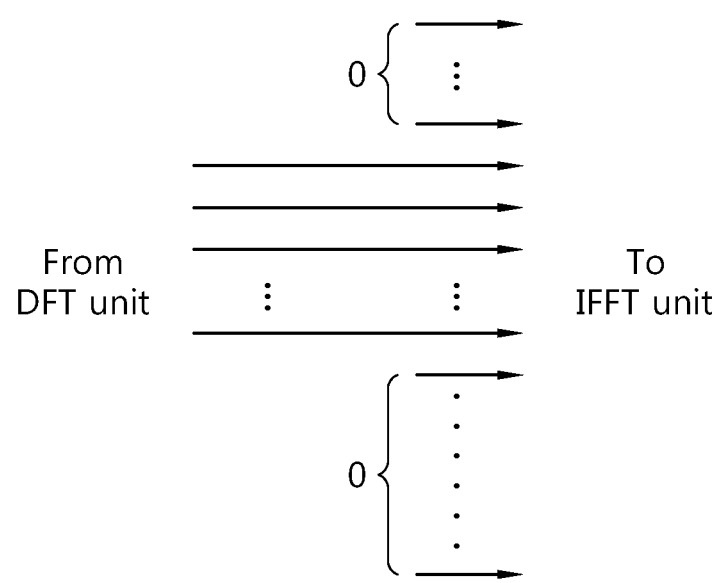
FIG. 26 shows an example of subcarrier mapping.

FIG. 26 shows an example of subcarrier mapping. The DFT symbols outputted from the DFT unit are mapped to contiguous subcarriers in the frequency domain. This is called localized mapping.

Figure 27:
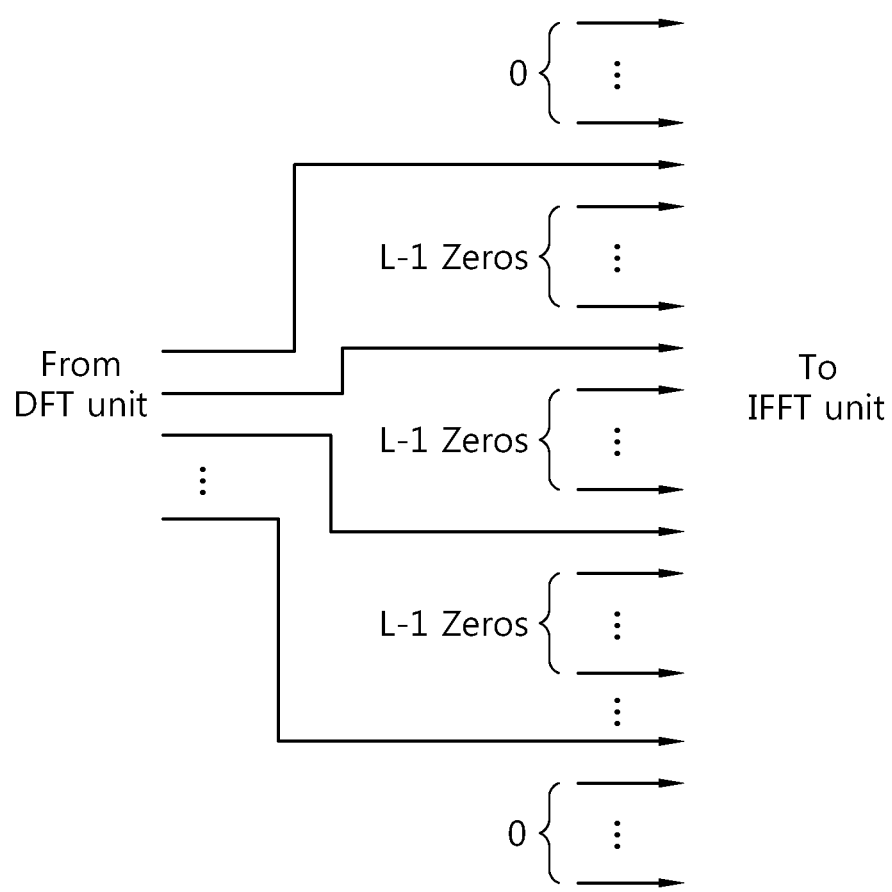
FIG. 27 shows another example of subcarrier mapping.

FIG. 27 shows another example of subcarrier mapping. The DFT symbols outputted from the DFT unit are mapped to non-contiguous subcarriers. The DFT symbols may be mapped to subcarriers distributed at equal distances in the frequency domain. This is called distributed mapping.

Figure 28:
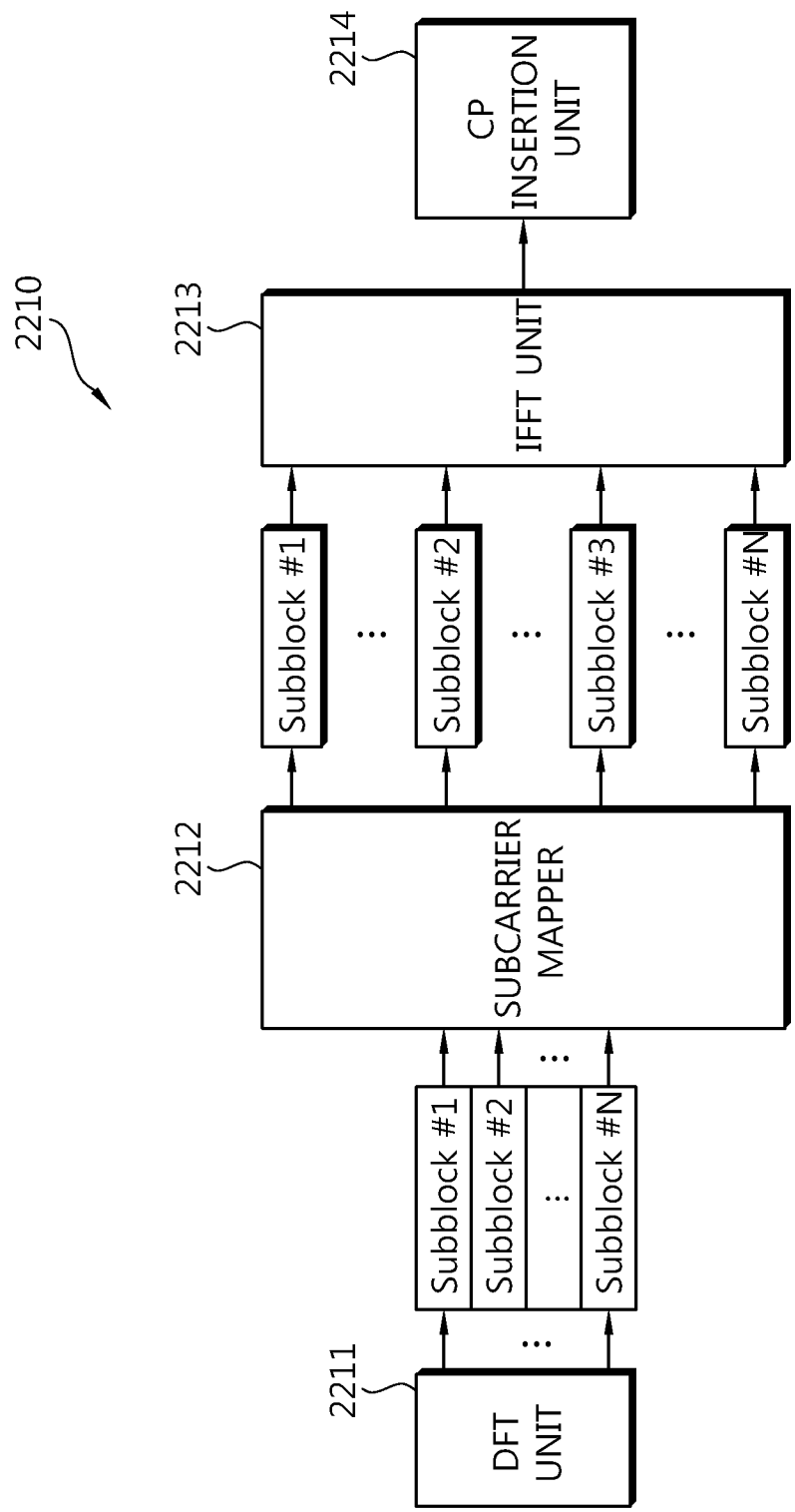
FIG. 28 is a block diagram showing a signal processing apparatus for performing clustered SC-FDMA.

FIG. 28 is a block diagram showing a signal processing apparatus for performing clustered SC-FDMA. A method of dividing DFT symbols in the unit of s subblock and processing the DFT symbols is called clustered SC-FDMA or clustered DFT-s OFDM. The signal processing apparatus 2210 includes a DFT unit 2211, a subcarrier mapper 2212, an IFFT unit 2213, and a CP insertion unit 2214.

DFT symbols outputted from the DFT unit 2211 are partitioned into N subblocks (N is a natural number). Here, the N subblocks may be represented into a subblock#1, a subblock#2 to a subblock#N. The subcarrier mapper 2212 maps the N subblocks to the subcarriers of the frequency domain in the unit of a subblock. The subcarrier mapper 2212 may perform localized mapping or distributed mapping for each subblock. The IFFT unit 2213 performs IFFT for the mapped subblocks in the frequency domain and outputs a time domain signal. The CP insertion unit 2214 inserts a CP into the time domain signal.

The signal processing apparatus 2210 can support a single carrier or multiple carriers. When only a single carrier is supported, the N subblocks correspond to the single carrier. When multiple carriers are supported, at least one of the N subblocks may correspond to each carrier.

Figure 29:
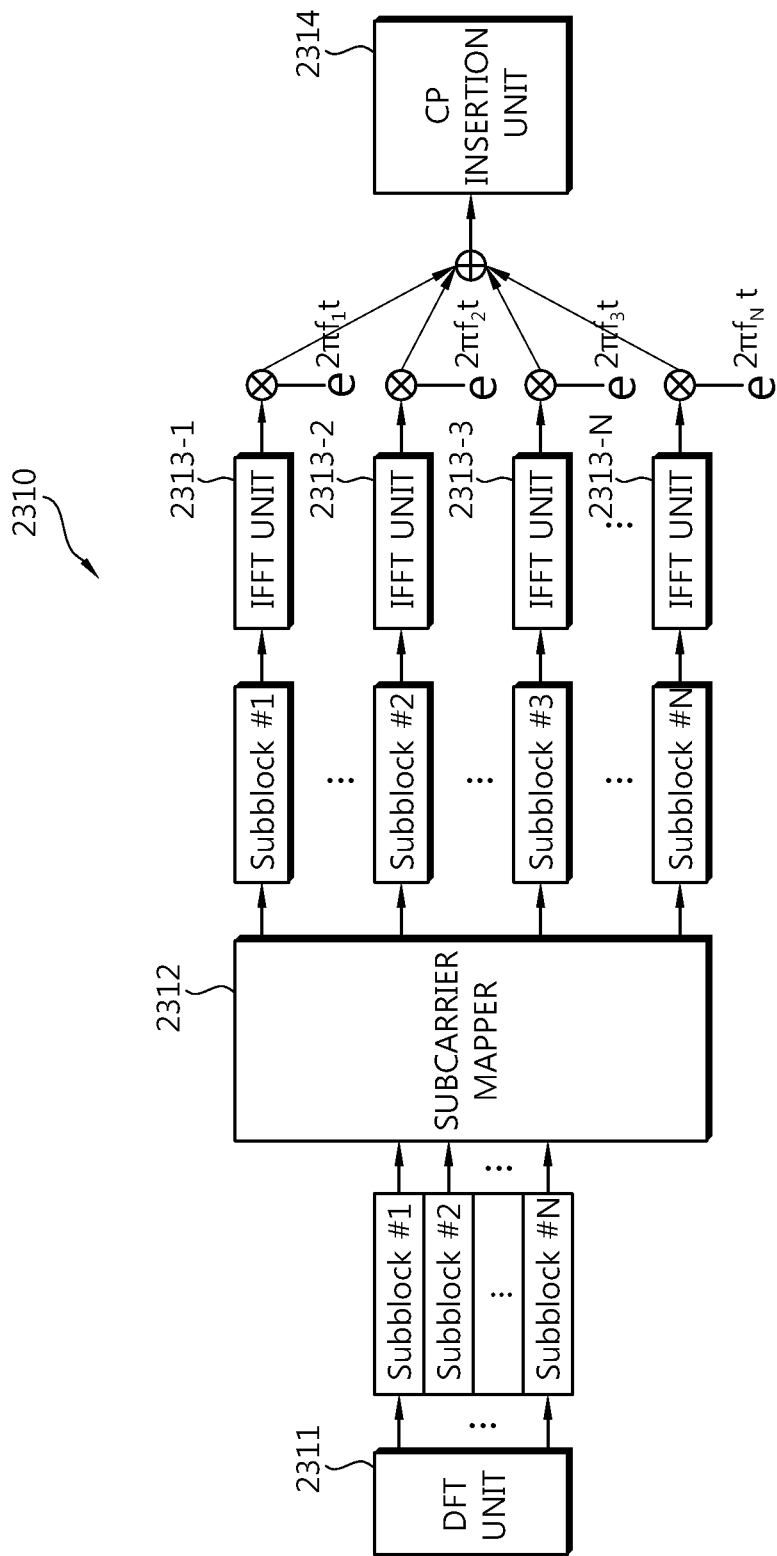
FIG. 29 is a block diagram showing another example of a signal processing apparatus supporting multiple carriers.

FIG. 29 is a block diagram showing another example of a signal processing apparatus supporting multiple carriers. The signal processing apparatus 2310 includes a DFT unit 2311, a subcarrier mapper 2312, a plurality of IFFT units 2313-1, 2313-2, ..., 2313-N, and a CP insertion unit 2214 (N is a natural number). DFT symbols outputted from the DFT unit 2311 are partitioned into N subblocks. The subcarrier mapper 2312 maps the N subblocks to the subcarriers of the frequency domain in the unit of a subblock. The subcarrier mapper 2312 may perform localized mapping or distributed mapping in the unit of a subblock. IFFT is independently performed for each of the mapped subblocks in the frequency domain. The CP insertion unit 2314 inserts a CP into a time domain signal. An $n^{th}$ IFFT unit 2313-$n$ performs IFFT for a subblock#n and outputs an $n^{th}$ time domain signal (n=1, 2, ..., N). The $n^{th}$ time domain signal is multiplied by an $n^{th}$ carrier (fn) signal, thereby generating an $n^{th}$ radio signal. After N radio signals generated from the N subblocks are added, the CP is inserted by the CP insertion unit 2314.

Each subblock may correspond to each carrier. Each subblock may correspond to a contiguous carrier or may correspond to a non-contiguous carrier.

FIG. 30 is a block diagram showing yet another example of a signal processing apparatus supporting multiple carriers. The signal processing apparatus 2410 includes a code block partition unit 2411, a chunk partition unit 2412, a plurality of channel coding units 2413-1 to 2413-N, a plurality of modulators 2414-1 to 2414-N, a plurality of DFT units 2415-1 to 2415-N, a plurality of subcarrier mappers 2416-1 to 2416-N, a plurality of IFFT units 2417-1 to 2417-N, and a CP insertion units 2418 (N is a natural number). Here, N may be the number of multiple carriers used by a multi-carrier transmitter.

The code block partition unit 2411 partitions a transmission block into a plurality of code blocks. The chunk partition unit 2412 partitions the code block into a plurality of chunks. Here, the code block may be data transmitted by a multi-carrier transmitter, and the chunk may be a data segment transmitted through one of multiple carriers. DFT is performed in the unit of a chunk. A transmission scheme for performing DFT in the unit of a chunk is called chunk-specific DFT-s OFDM or Nx SC-FDMA. This may be used in the allocation of contiguous carriers or the allocation of non-contiguous carriers. The partitioned chunks sequentially become respective complex-valued symbols through the plurality of channel coding units 2413-1 to 2413-N, respectively, and the plurality of modulators 2414-1 to 2414-N, respectively. The complex-valued symbols are added through the plurality of respective DFT units 2415-1 to 2415-N, the plurality of respective subcarrier mappers 2416-1 to 2416-N, and the plurality of respective IFFT units 2417-1 to 2417-N. A CP is added to symbols in the CP insertion units 2418.

The OFDM symbol may be any multi-access scheme symbol or a time domain symbol, such as OFDMA, DFT-s OFDM, clustered DFT-s OFDM and/or chunk-specific DFT-s OFDM, but not limited to a specific multi-access scheme.

In the above-described exemplary systems, although the methods have been described on the basis of the flowcharts using a series of steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and other steps may be included or one or more steps of the flowcharts may be deleted without affecting the scope of the present invention.

The above-described embodiments include various aspects of illustrations. Although all kinds of possible combinations for representing the various aspects may not be described, a person having ordinary skill in the art will understand that other possible combinations are possible. Accordingly, the present invention may be said to include all other replacements, modifications, and changes belonging to the accompanying claims.

What is claimed is:

1. A method of transmitting data using a plurality of resources in a multi-antenna system, the method comprising:
generating a plurality of modulation symbols by mapping encoded bits on a constellation by m (m>1) bits using a mapping rule in which a resource selection scheme and a modulation scheme are combined;
generating a plurality of transmission symbols by performing spatial processing, according to a plurality of resources and a plurality of antennas, for the plurality of modulation symbols; and
transmitting the plurality of transmission symbols through the plurality of respective antennas,
wherein each of the plurality of modulation symbols on the constellation is generated based on the plurality of resources, corresponding to n (n≥1) bits of the m bits, by the resource selection scheme, and phase shift keying (PSK) of a $2^{(m-n)}$ order or quadrature amplitude modulation (QAM) of a $2^{(m-n)}$ order corresponding to (m-n) bits, by the modulation scheme,
wherein the plurality of resources is a plurality of cyclic shift indices,
wherein the plurality of resources includes a first cyclic shift index $I_{cs1}$ and a second cyclic shift index $I_{cs2}$,
wherein m=4 and n=1, and
wherein the constellation is an 8-PSK constellation according to a following table:

| $I_{cs1}$ | | $I_{cs2}$ | |
|---|---|---|---|
| I | Q | I | Q |
| $-1/\sqrt{2}$ | $-1/\sqrt{2}$ | | |
| $-1$ | $0$ | | |
| | | $-1$ | $0$ |
| | | $-1/\sqrt{2}$ | $-1/\sqrt{2}$ |
| | | $0$ | $1$ |
| $-1/\sqrt{2}$ | $1/\sqrt{2}$ | $0$ | $0$ |
| | | $-1/\sqrt{2}$ | $1/\sqrt{2}$ |
| $0$ | $1$ | | |
| $0$ | $-1$ | | |
| | | $1/\sqrt{2}$ | $-1/\sqrt{2}$ |
| $1/\sqrt{2}$ | $-1/\sqrt{2}$ | | |
| | | $0$ | $-1$ |
| | | $1/\sqrt{2}$ | $1/\sqrt{2}$ |
| | | $1$ | $0$ |
| $1$ | $0$ | | |
| $1/\sqrt{2}$ | $1/\sqrt{2}$. | | |

2. The method of claim 1, wherein a first transmission symbol corresponding to a first antenna and a second transmission symbol corresponding to a second antenna are generated from one modulation symbol through the spatial processing.

3. The method of claim 2, wherein the second transmission symbol has a complex conjugate or negative complex conjugate relationship with the first transmission symbol.

4. The method of claim 3, wherein resources used by the first transmission symbol and the second transmission symbol are different from each other.

5. The method of claim 1, further comprising the plurality of resources being allocated by a base station.

6. The method of claim 2, wherein:
the base station informs information about one of the plurality of resources, and
remaining resources are obtained from the informed resource.

7. A transmitter having multiple antennas, the transmitter comprising:
a mapper generating a plurality of modulation symbols by mapping encoded bits on a constellation by m (m>1) bits using a mapping rule in which a resource selection scheme and a modulation scheme are combined;
a spatial processor generating a plurality of transmission symbols by performing spatial processing, according to a plurality of resources and a plurality of antennas, for the plurality of modulation symbols; and
a plurality of antennas transmitting the plurality of transmission symbols,
wherein the mapper generates each of the plurality of modulation symbols on the constellation based on the plurality of resources, corresponding to n (n≥1) bits of the m bits, by the resource selection scheme, and PSK (Phase Shift Keying) of a $2^{(m-n)}$ order or QAM (quadrature amplitude modulation) of a $2^{(m-n)}$ order corresponding to (m-n) bits, by the modulation scheme,
wherein the plurality of resources is a plurality of cyclic shift indices,
wherein the plurality of resources includes a first cyclic shift index $I_{cs1}$ and a second cyclic shift index $I_{cs2}$,
wherein m=4 and n=1, and
wherein the constellation is an 8-PSK constellation according to a following table:

| $I_{cs1}$ | | $I_{cs2}$ | |
|---|---|---|---|
| I | Q | I | Q |
| $-1/\sqrt{2}$ | $-1/\sqrt{2}$ | | |
| $-1$ | $0$ | | |
| | | $-1$ | $0$ |
| | | $-1/\sqrt{2}$ | $-1/\sqrt{2}$ |
| | | $0$ | $1$ |
| $-1/\sqrt{2}$ | $1/\sqrt{2}$ | $0$ | $0$ |
| | | $-1/\sqrt{2}$ | $1/\sqrt{2}$ |
| $0$ | $1$ | | |
| $0$ | $-1$ | | |
| | | $1/\sqrt{2}$ | $-1/\sqrt{2}$ |
| $1/\sqrt{2}$ | $-1/\sqrt{2}$ | | |
| | | $0$ | $-1$ |
| | | $1/\sqrt{2}$ | $1/\sqrt{2}$ |
| | | $1$ | $0$ |
| $1$ | $0$ | | |
| $1/\sqrt{2}$ | $1/\sqrt{2}$. | | |

8. The transmitter of claim 7, wherein the spatial processor generates the plurality of transmission symbols so that the plurality of resources is transmitted through the plurality of respective antennas.

9. The transmitter of claim 7, wherein the spatial processor generates a first transmission symbol, corresponding to a first antenna, and a second transmission symbol, corresponding to a second antenna, from one modulation symbol through the spatial processing, wherein the second transmission symbol has a complex conjugate or negative complex conjugate relationship with the first transmission symbol.

10. The transmitter of claim 9, wherein resources used by the first transmission symbol and the second transmission symbol are different from each other.

* * * * *